United States Patent [19]
Robert et al.

[11] Patent Number: 6,104,712
[45] Date of Patent: *Aug. 15, 2000

[54] WIRELESS COMMUNICATION NETWORK INCLUDING PLURAL MIGRATORY ACCESS NODES

[76] Inventors: Bruno G. Robert, Vossestraat, 56, 3090-Overijse Brussels, Belgium; James J. Proto, 405 Watts Branch Pkwy., Rockville, Md. 20854

[*] Notice: This patent issued on a continued prosecution application filed under 37 CFR 1.53(d), and is subject to the twenty year patent term provisions of 35 U.S.C. 154(a)(2).

[21] Appl. No.: 09/253,690

[22] Filed: Feb. 22, 1999

[51] Int. Cl.[7] .............................. H04L 12/28; H04L 12/56
[52] U.S. Cl. .............................. 370/389; 342/57; 342/58; 455/432
[58] Field of Search .................................... 370/389, 313, 370/315, 316, 319, 326, 328, 334, 337, 338, 339, 344, 347, 442, 483, 487, 493, 519; 342/58, 56, 57, 76, 89, 90, 95, 96, 114, 109, 139, 191; 343/712, 754, 731; 455/426, 428, 432, 434

[56] References Cited

U.S. PATENT DOCUMENTS

| | | | |
|---|---|---|---|
| 3,609,246 | 9/1971 | Muller et al. | 455/422 |
| 3,913,017 | 10/1975 | Imaseki | 455/422 |
| 4,125,808 | 11/1978 | Graham | 455/7 |
| 4,276,643 | 6/1981 | Laprie et al. | 370/351 |
| 4,484,353 | 11/1984 | Flottes et al. | 455/422 |
| 4,539,706 | 9/1985 | Mears et al. | 455/11.1 |
| 4,748,660 | 5/1988 | Deveze | 340/825.8 |
| 4,906,989 | 3/1990 | Kasugai | 340/825.44 |
| 4,987,356 | 1/1991 | Humblet | 320/256 |
| 5,109,526 | 4/1992 | Reed | 455/15 |
| 5,184,347 | 2/1993 | Farwell et al. | 370/350 |
| 5,212,806 | 5/1993 | Natarajan | 455/525 |
| 5,239,666 | 8/1993 | Truby | 455/9 |
| 5,245,616 | 9/1993 | Olson | 370/394 |
| 5,276,680 | 1/1994 | Messenger | 370/311 |

(List continued on next page.)

OTHER PUBLICATIONS

T. Imielinski, et al., GPS–Based Addressing and Routing, RFC 2009, 1–24 pages.

Tomasz Imielinski, et al., GPS–Based Addressing and Routing, Mar. 7, 1996, 1–16 pages.

David B. Johnson, Routing in Ad Hoc Networks of Mobile Hosts, Dec. 1994, 1–6 pages.

(List continued on next page.)

*Primary Examiner*—Dang Ton
*Assistant Examiner*—Phirin Sam
*Attorney, Agent, or Firm*—Kile McIntyre Harbin & Lee, LLP; Lawrence Harbin

[57] ABSTRACT

An amorphous communication network having no traditional wireless backbone has plural roving or migratory access node or terminal devices that are carried or transported along with individuals. Each wireless node has a user interface and a local ID, e.g., an IP address, URL, telephone number. Voice, data, or video is transferred to other migratory nodes or to a conventional land-based telephone or data terminal via a PSTN, Internet, ATM network, etc. A geolocation detector in the node, such as a GPS, keeps track of the instantaneous position, which is conveyed to a locally or remotely stored database. A local processor accesses this database to determine node-to-node paths to a destination when said node operates as a source. A node captures a transmitted message when the destination address in the message matches its local address, or otherwise forwards the message towards a destination if the address does not match. Acknowledgements are sent between nodes upon successful receipt of information. The node's wireless transceiver also adapts to the environment and terrain to control transmission and reception characteristics according to bandwidth, inter-node spacing, signal strength, bit error rate, node population density, frequency spectrum, data rate and/or air interface protocol. Nodes may periodically or randomly unicast or broadcast its ID and/or position data to update a database, which then may be propagated to other databases throughout the network. A database may reside locally within a node or at fixed regional locations that are linked together to form a global database.

23 Claims, 36 Drawing Sheets

U.S. PATENT DOCUMENTS

| | | | |
|---|---|---|---|
| 5,321,736 | 6/1994 | Beasley | 455/422 |
| 5,410,543 | 4/1995 | Seitz et al. | 370/463 |
| 5,412,654 | 5/1995 | Perkins | 370/312 |
| 5,479,400 | 12/1995 | Dilworth et al. | 192/45 |
| 5,481,532 | 1/1996 | Hassan et al. | 370/312 |
| 5,481,539 | 1/1996 | Hershey et al. | 370/312 |
| 5,530,909 | 6/1996 | Simon et al. | 455/11.1 |
| 5,533,026 | 7/1996 | Ahmadi et al. | 370/349 |
| 5,561,851 | 10/1996 | Hubbell et al. | 455/512 |
| 5,627,971 | 5/1997 | Miernik | 370/238 |
| 5,652,751 | 7/1997 | Sharony | 370/228 |
| 5,654,959 | 8/1997 | Baker et al. | 370/331 |
| 5,677,837 | 10/1997 | Reynolds | 455/456 |
| 5,703,598 | 12/1997 | Emmons | 342/457 |
| 5,710,764 | 1/1998 | Yoshimura et al. | 455/16 |
| 5,734,348 | 3/1998 | Aoki et al. | 342/352 |
| 5,742,509 | 4/1998 | Goldberg et al. | 701/211 |
| 5,748,619 | 5/1998 | Meier | 370/278 |
| 5,758,261 | 5/1998 | Wiedeman | 455/427 |
| 5,774,856 | 6/1998 | Haber et al. | 704/270 |
| 5,787,111 | 7/1998 | Gilmore | 370/328 |
| 5,796,365 | 8/1998 | Lewis | 342/357.03 |
| 5,809,025 | 9/1998 | Timbs | 370/400 |
| 5,812,531 | 9/1998 | Cheung et al. | 370/255 |
| 5,822,309 | 10/1998 | Ayanoglu, et al. | 370/315 |
| 5,825,759 | 10/1998 | Liu | 370/331 |
| 5,860,058 | 1/1999 | Daniel et al. | 455/427 |
| 5,862,345 | 1/1999 | Okanoue et al. | 370/312 |
| 5,862,479 | 1/1999 | Cutler, Jr. et al. | 455/428 |
| 5,867,792 | 2/1999 | Ichiyoshi | 455/526 |
| 5,872,773 | 2/1999 | Katzela, et al. | 370/256 |
| 5,873,036 | 2/1999 | Vucetic | 455/439 |
| 5,883,884 | 3/1999 | Atkinson | 370/279 |
| 5,890,054 | 3/1999 | Logsdon et al. | 455/11.1 |
| 5,898,679 | 4/1999 | Brederveld et al. | 370/315 |
| 5,903,837 | 5/1999 | Wiedeman | 455/427 |
| 5,926,133 | 7/1999 | Green, Jr. | 342/363 |
| 5,930,254 | 7/1999 | Liron et al. | 370/395 |
| 5,987,011 | 11/1999 | Toh | 370/331 |

OTHER PUBLICATIONS

Ben Bennington, et al., Mobile Communication System for the Construction and Mining Industry, Information Networking Institute, The Wireless Research Program, 1997–1999 (http://www.ini.cum.edu/wireless/Caterpillar/index.html), 1–7.

Barry M. Leiner, Second USENIX Symposium on Mobile and Location–Independent Computing Proceedings, Apr. 10–11, 1995, 1–2 pages.

Papers on Ad–hoc Multihop Wireless Networks, 1–3 pages.

Geocasting in Mobile Ad Hoc Networks : Location–Based Multicast Algorithms, 1–2 pages.

Tsu–Wei Chen, et al., Global State Routing : A New Routing Scheme for Ad–hoc Wireless Networks, 1–5 pages.

Shree Murthy, et al., An Efficient Routing Protocol for Wireless Networks, 1–27 pages.

Josh Broch, A Performance Comparison of Multi–Hop Wireless Ad Hoc Network Routing Protocols, 1–13 pages.

Zygmunt J. Haas, et al., The Zone Routing Protocol for Ad Hoc Networks, 1–20 pages.

Zygmunt J. Haas, A New Routing Protocol for the Reconfigurable Wireless Networks, 1–5 pages.

Shree Murthy, et al., A Routing Protocol for Packet Radio Networks, 1–10 pages.

Fabrizio Talucci, et al., A Wireless MAC Protocol for High Speed ad hoc Networking, 1–5 pages.

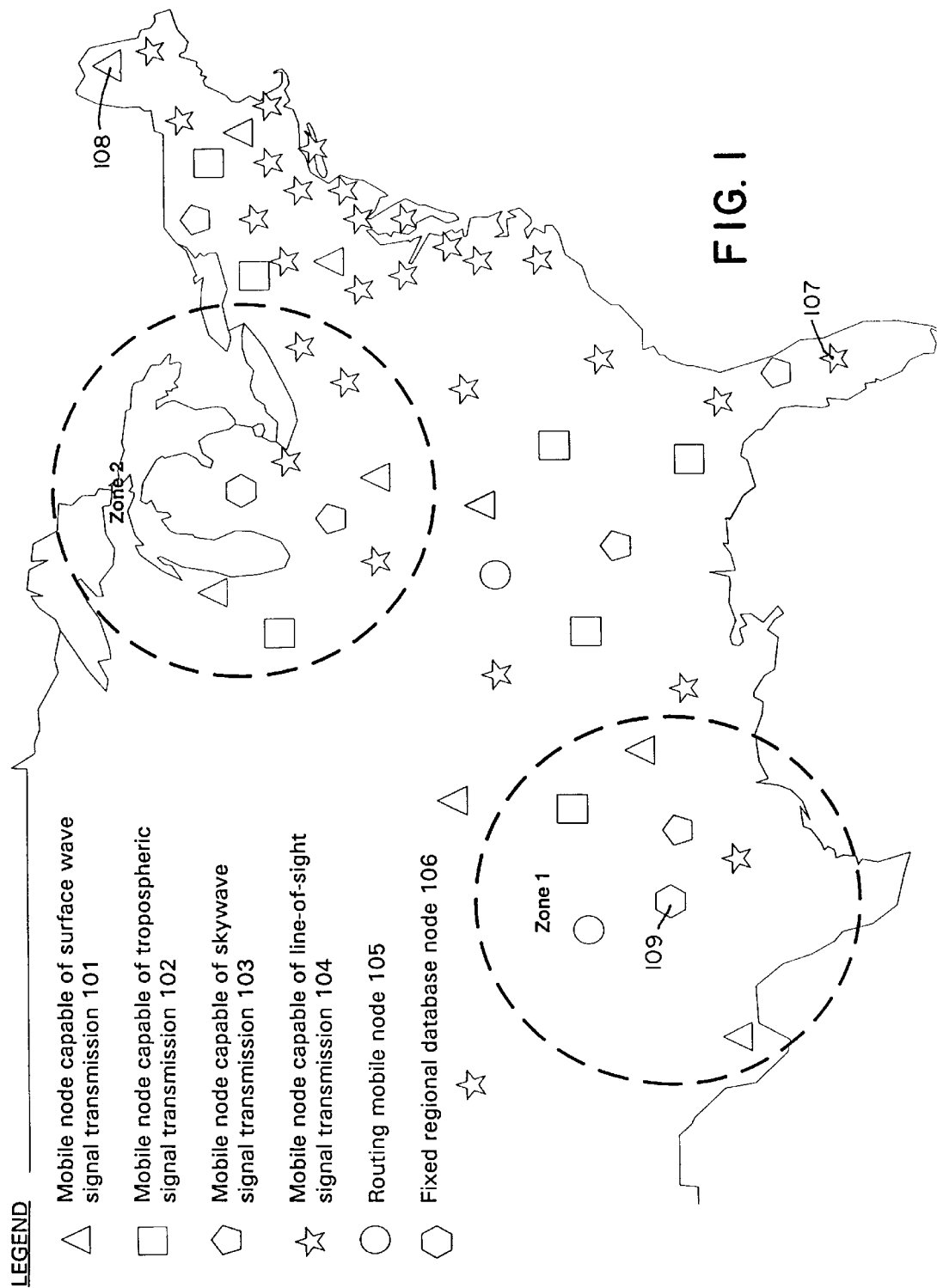

FIG. 5

| Start Flag 301 | Packet Type 502 | Source MNID 503 | | | Optional Source MAN ID 507 | Network Packet ID 508 | Packet CRC 322 | End Flag 323 |
|---|---|---|---|---|---|---|---|---|
| | | X coordinate 504 | Y coordinate 505 | Z coordinate 506 | | | | |

FIG. 6

| Start Flag 301 | Packet Type 602 | Source MNID 603 | | | Current Location 607 | | | Optional Source MAN ID 611 | Packet CRC 322 | End Flag 323 |
|---|---|---|---|---|---|---|---|---|---|---|
| | | X coordinate 604 | Y coordinate 605 | Z coordinate 606 | X coordinate 608 | Y coordinate 609 | Z coordinate 610 | | | |

WIRELESS COMMUNICATION NETWORK INCLUDING PLURAL MIGRATORY ACCESS NODES

BACKGROUND OF THE INVENTION

This invention is related to a wireless network communication system, but more specifically, to an "amorphous" communication network utilizing plural migratory access nodes for providing access and transfer of information.

The inventive system embraces a network that includes autonomous migratory or roving access points for allowing end-to-end transparent communication between and among voice, video or data terminals moving about a region along with individuals. Distributed access and/or routing nodes convey packets or other information across a wireless network that is, for the most part, entirely mobile. The inventive system differs from conventional wireless networks by avoiding the necessity of a network backbone or conventional mobile switching centers that manage and control transfers of information and network access. In essence, the migratory network of the present invention is amorphous in the sense that its has no defined backbone or central administration or control, and that communication links thereof constantly vary according the to population densities, locations, and instantaneous node-to-node routes of intercommunication devices or nodes. Terrestrial networks as well as stationary nodes, however, may be used in conjunction with the inventive migratory network.

Effective use is predicated on seeding a given region with a minimum density of migratory "black box" autonomous nodes, whereby individuals possessing such a node device may communicate with each other and/or permit their node devices to relay messages transgressing the migratory network. Effectiveness is further predicated on typical migration and mobility patterns of individuals. As the nodes move about a region along with individuals, communication will rely on node-to-node transfers to relay information between individuals and/or data terminals. The probability of achieving sufficient and adequate network capacity, efficiency, or "call completion" increases as more individuals possess nodes. The invention is particularly useful by residents of urban areas, sparsely to moderately populated rural areas, university campuses, and the like, and aims to provide free, unencumbered communication to citizens over several hundred to thousands of miles.

Such a system represents a significant departure from traditional cellular networks which, for administration and billing reasons, prevent subscriber units from directly communicating with each other without passing through a fixed switching center. The invention also differs in avoiding relatively higher infrastructure development costs. In brief, the present invention liberates individuals from conventional control, monitoring, administration and billing requirements.

Accordingly, it is a primary objective of the present invention to provide a communication network and method utilizing migratory access points thereby obviating high costs and delays associated with infrastructure development.

It is a further objective of the present invention to provide a communication system offering rapid deployment and self-maintenance in urban, rural and/or campus-like settings.

It is yet another objective of the present invention to circumvent administrative controls and costs associated with traditional wireless cellular systems, thereby freeing individuals of unwanted burdens and intrusions.

It is yet a further objective of the present invention to provide a node-to-node communication system, method, and/or protocol that adapts to various environmental and terrestrial conditions to enable migratory or roving nodes to effectively intercommunicate.

It is a further objective of the present invention to integrate its use and operation with various geolocation systems for automatically providing position information for use in determining whereabouts of destination devices and nodes.

It is another objective of the present invention to provide a system and method of transparent communication through layered communication protocols thereby alleviating the need to use any special interface to communicate with another user.

It is also an objective of the present invention to provide autonomous migratory nodes or communication devices and methods that freely operate at will in a self-sustaining integrated communication system without restriction of access, pre-registration, or other controls traditionally associated with fixed-based wireless cellular systems.

SUMMARY OF THE INVENTION

In accordance with an aspect of the invention, a method of wireless communication using a distributed access network is achieved by providing plural migratory or roving access nodes to populate a region of desired service, optionally determining a node-to-node route between a source and destination, initiating a data transfer between the source and destination by way of the migratory nodes, conveying information from the source to the destination by relaying the information between and among the migratory nodes, and receiving the information at the destination node. Refinements include geolocating the position of the migratory nodes using a GPS or other geopositioning system and, then determining the node-to-node route according to the results of geolocation. Acknowledgements also may be sent between nodes upon successful receipt of information. In addition, transceiver characteristics may be altered according to node population density, data rates, signal strength, bit error rates, environment surroundings, terrain, position, inter-node distance, or other factors.

In another aspect of the invention, an autonomously operating migratory node provides roving access points and forms a self-maintaining, amorphous wireless network for members of users possessing a node device. The migratory node device has a local ID and includes a user interface that is capable of receiving an ID of an intended recipient, e.g., an IP address, URL, telephone number, or any other indicia. User information, which may include voice, data or video, is transferred to another migratory node or to a telephone or data terminal of a conventional land line network, e.g., PSTN, Internet, ATM network, etc. The migratory node further includes a geolocation detector that locates the instantaneous position of the node, a wireless transmitter capable of transmitting a payload message at least to another node, and a wireless receiver capable of receiving a payload message from at least another node. In addition, a processor effects assembly of network packets containing instantaneous position information, a source ID indicative of a node initiating a data transfer, a destination ID indicative of a destination node, and a payload message. Routines in the processor effect determination of possible node-to-node paths from a source to a destination when the node operates as a source, effect capture of a payload message when the ID of the destination field in the packet matches the local ID, and otherwise effect automatic forwarding of information to a destination according to ID or address information contained in the information packet.

BRIEF DESCRIPTION OF THE DRAWINGS

FIG. 5 identifies the major fields of a network ACK packet 500, which includes addressing and identification data.

FIG. 6 identifies the major fields of an information packet 600, which includes addressing, location and identification data.

DETAILED DESCRIPTION OF THE INVENTION

Figures 1, 7A:
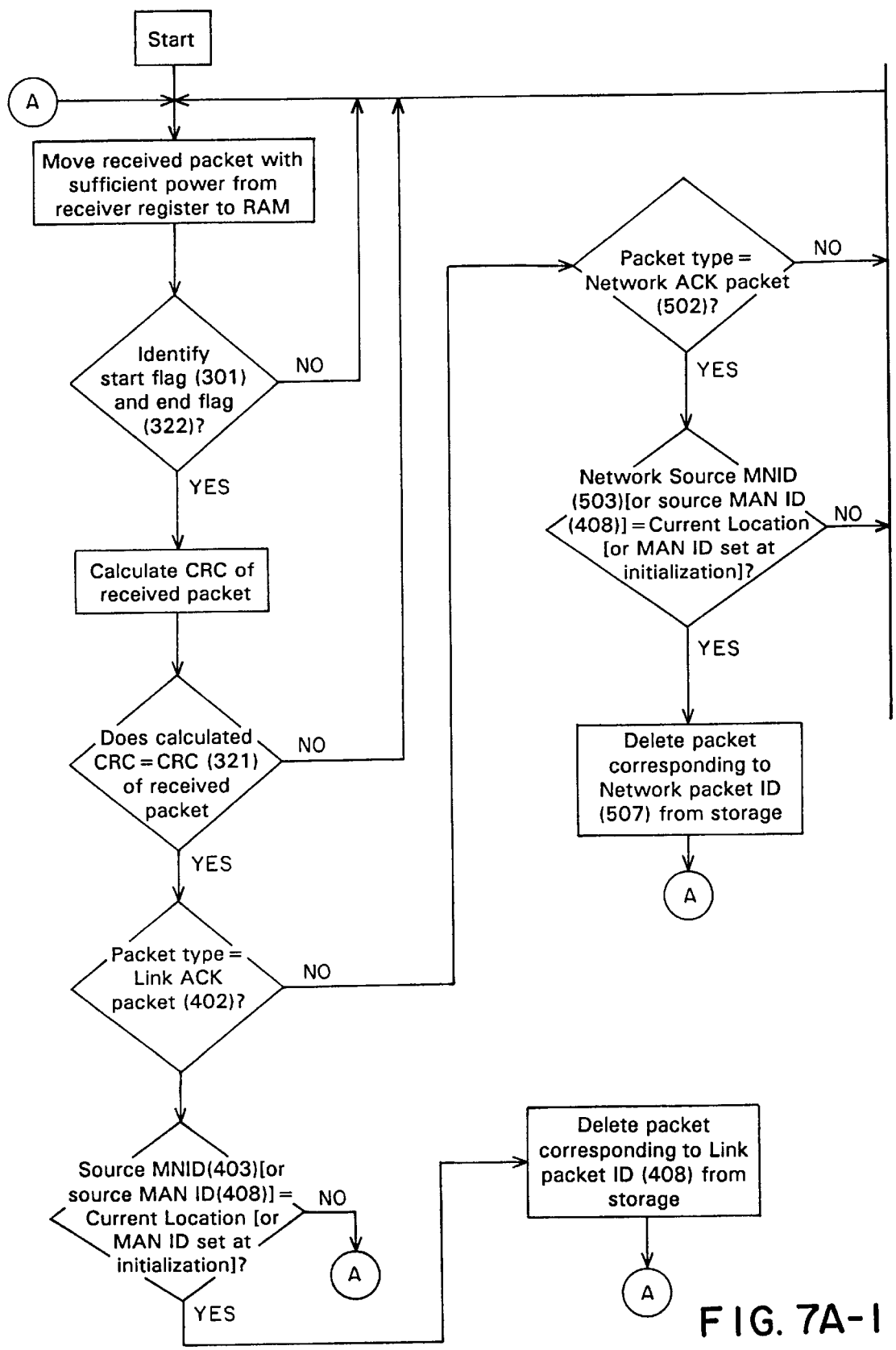
FIG. 1 illustrates a typical deployment of migratory access nodes (MANs) of the present invention.
FIGS. 7A–7D is a flow diagram showing how the present invention processes incoming packets which have been latched into temporary storage (e.g., RAM) corresponding to signals received by the signal receiver 213.
Figures 2, 7A:
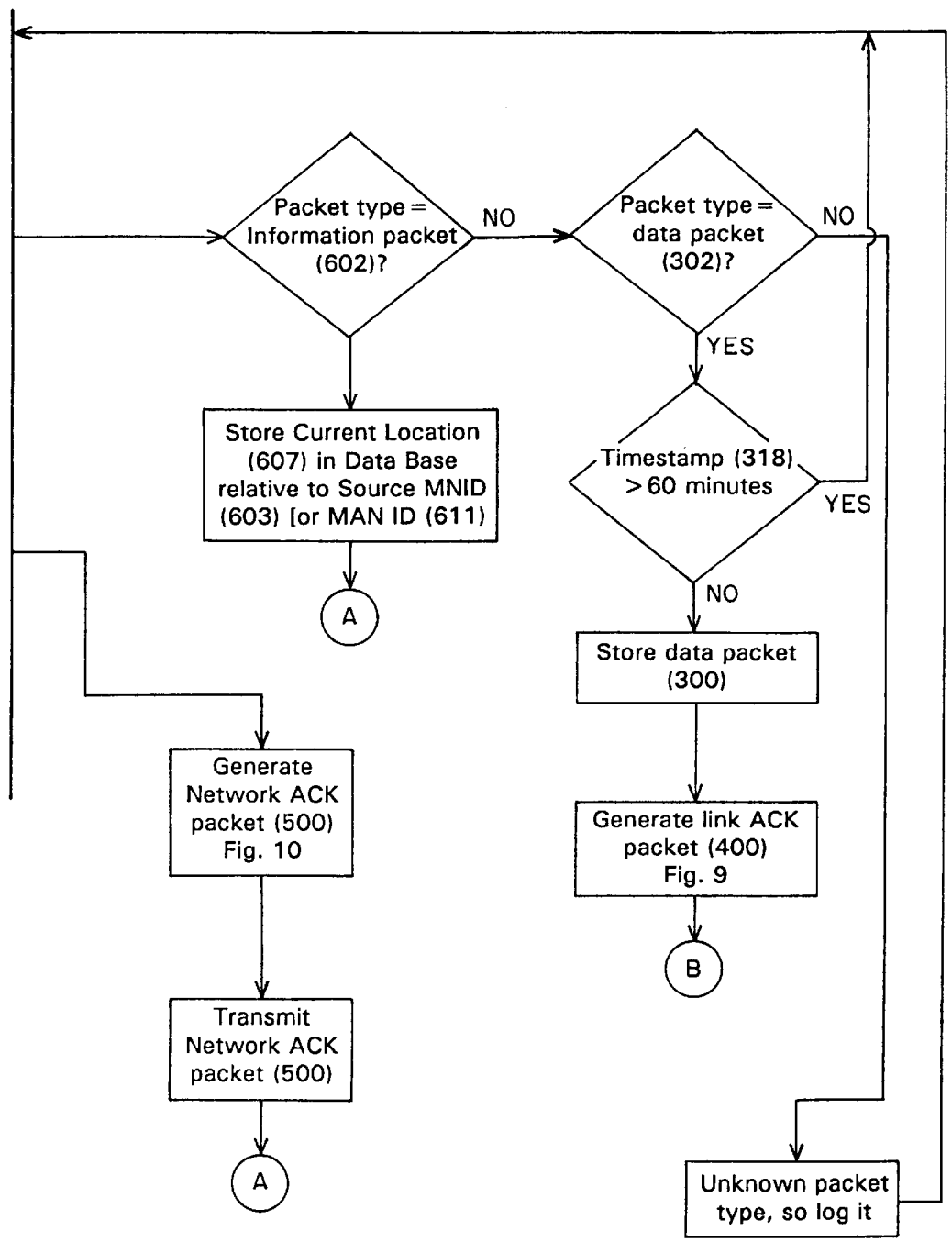
Figures 1, 7B:
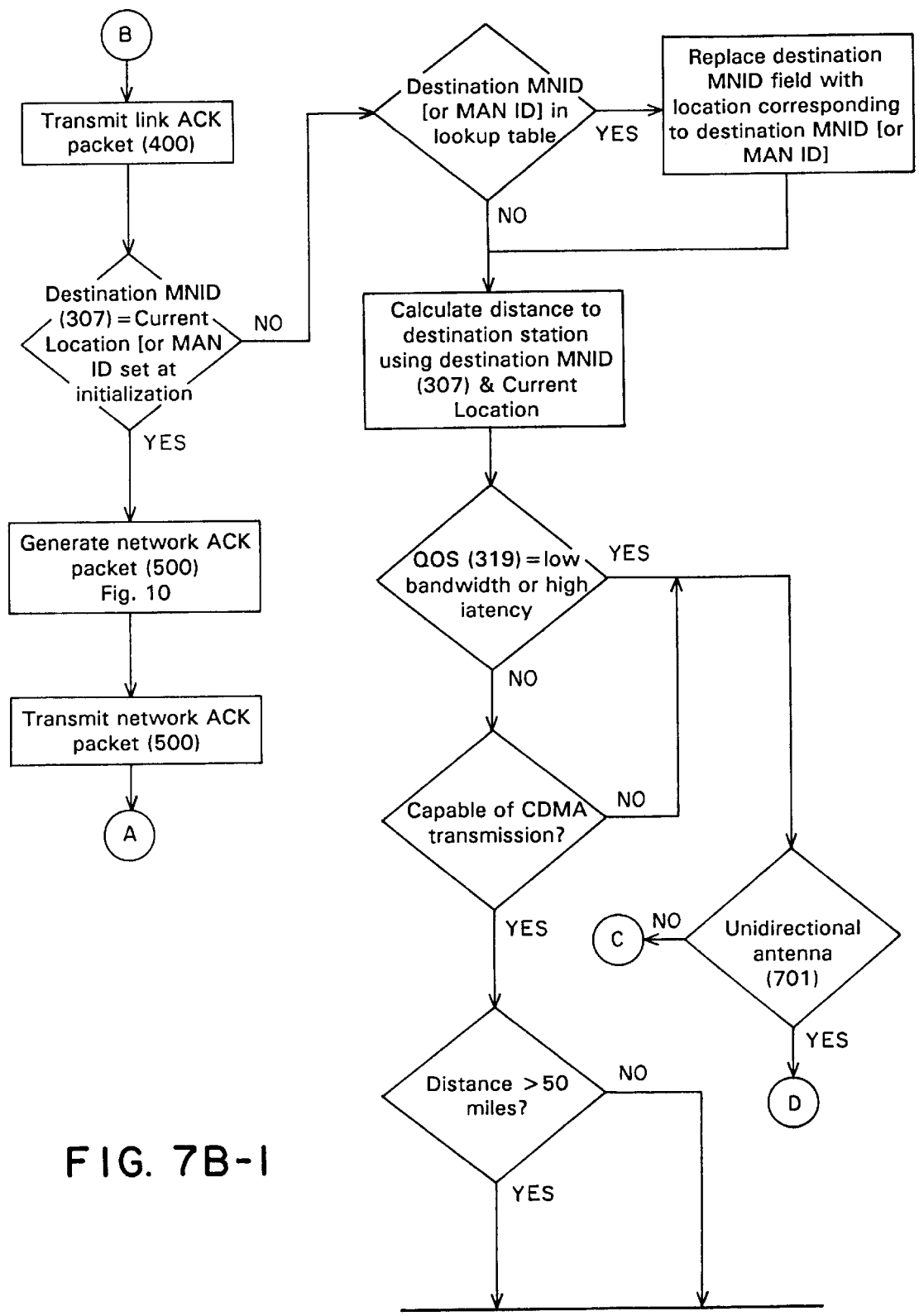
Figures 2, 7B:
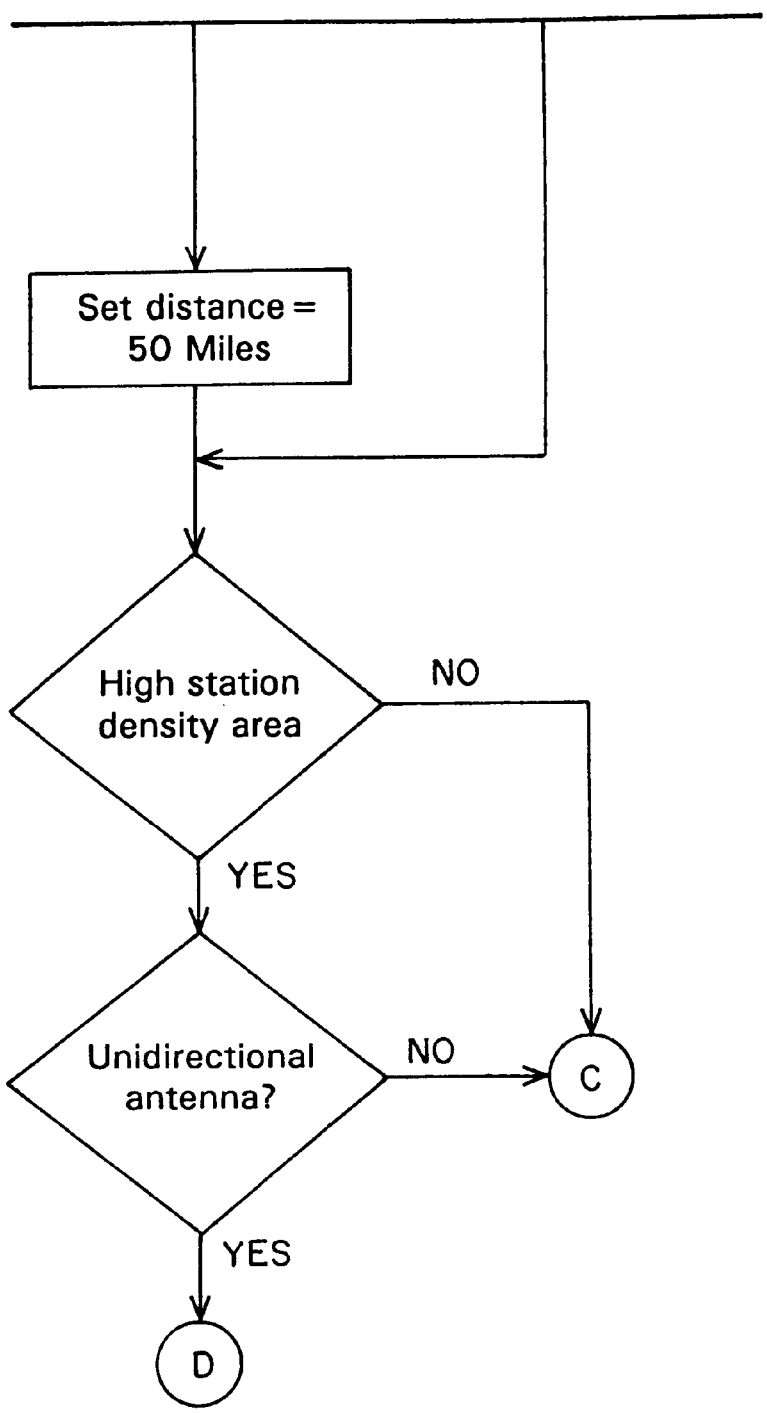
Figure 7C:
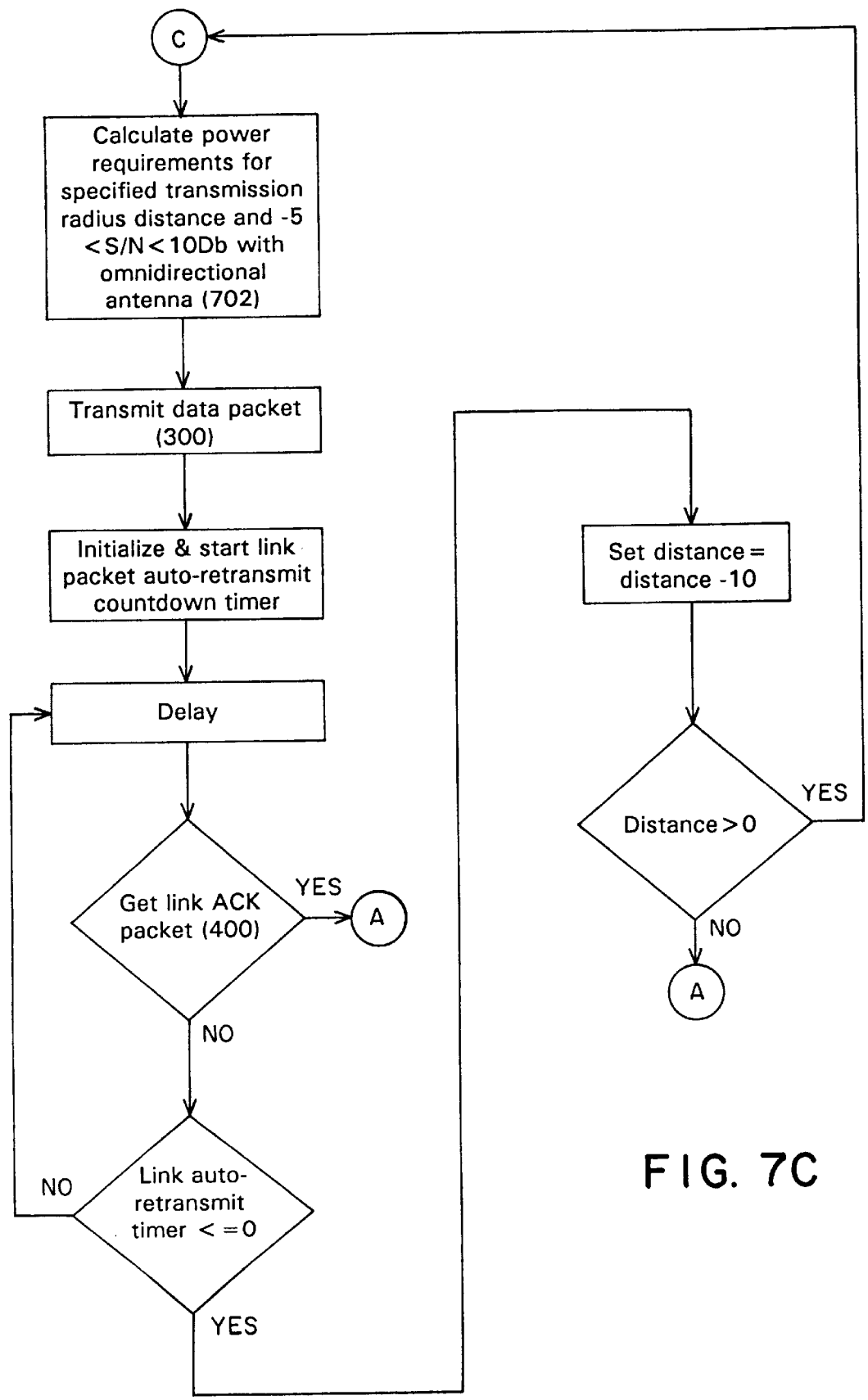
Figures 1, 7D:
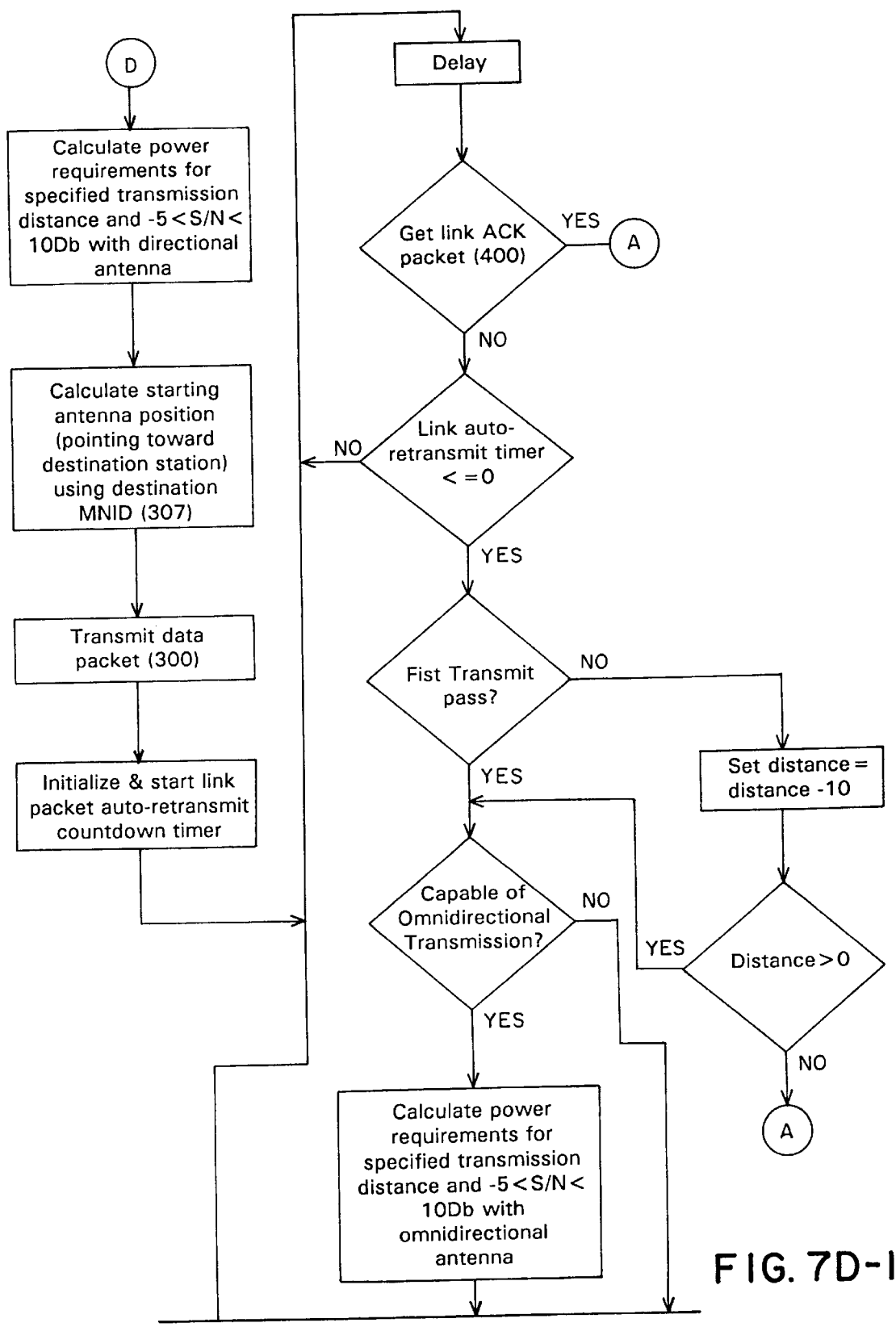
Figures 2, 7D:
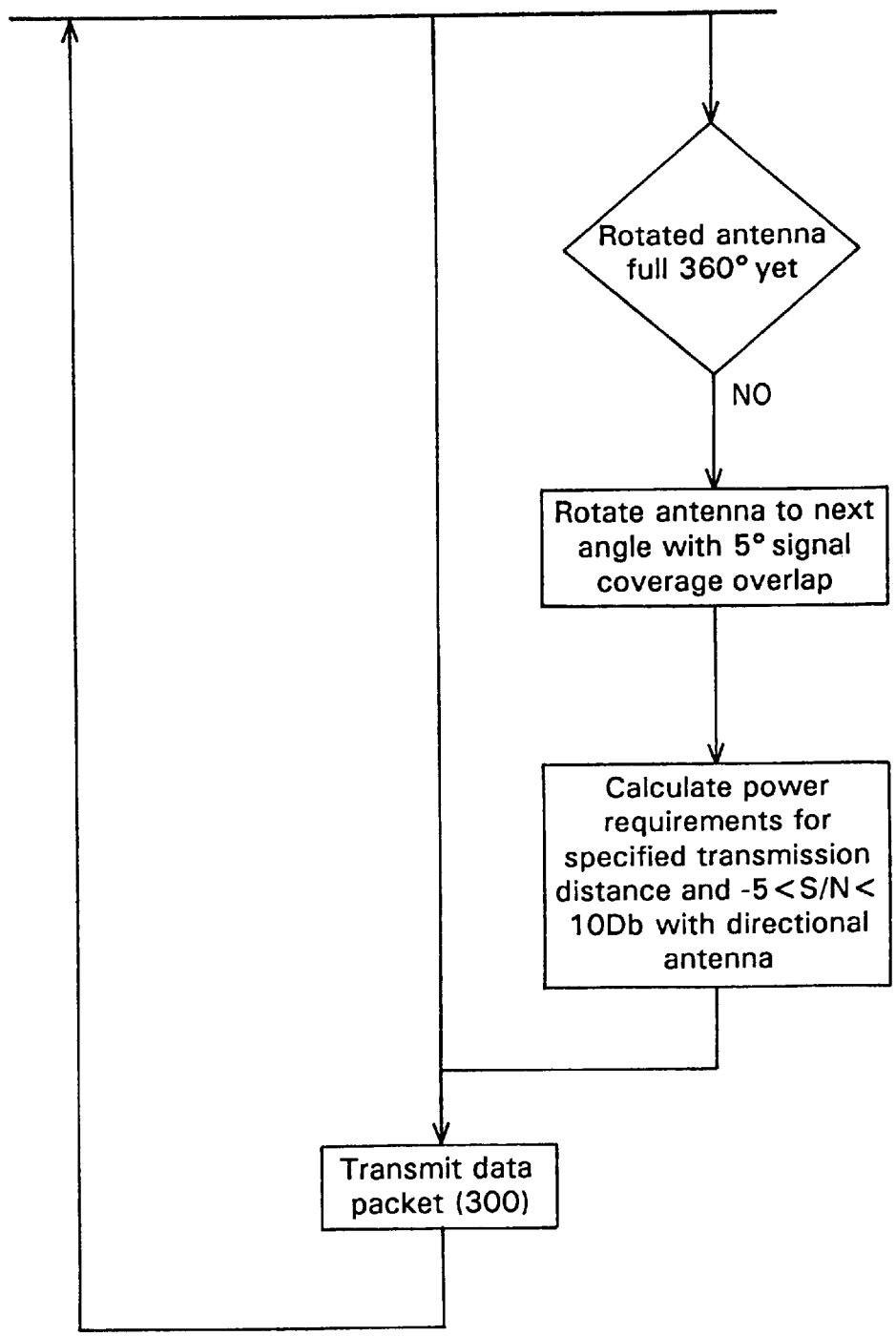

Glossary & Definitions
ACK—Acknowledgement
CDMA—Code Division Multiple Access
CPU—Central Processing Unit
CRC—Cyclical Redundancy Check
HDLC—High Level Data Link Control
IP—Internet Protocol
LLC—Link Layer Control
MAC—Medium Access Control
MAN—Migratory Access Node
MNID—Migratory node Identification
MUF—Maximum Useable Frequency
NAK—Negative Acknowledgement
NVRAM—Non-volatile Random Access Memory
OSI—Open System Interconnection
PLI—Physical Location Identifier
QOS—Quality of Service
RAM—Random Access Memory
RFC—Request for Comments document
S/N—Signal to Noise Ratio
TCP—Transmission Control Protocol
TDMA—Time Division Multiple Access
UDP—User Datagram Protocol A. General System Description FIG. 1 illustrates a typical implementation of the present invention. The data network utilizing autonomously operating migratory access nodes includes MANs capable of line-of-sight 104, surface wave (diffracted) 101, tropospheric scatter (reflected and refracted) 102, skywave (refracted) 103 signal propagation, or any other electromagnetic signal propagation means, as well as an optional fixed regional database node 106 (which may be a MAN unit which remains stationary). The optional fixed regional database MANs may convey the information in their databases to each other either through point-to-point wireless or wired communication or through the MANs of the isslustrated network to io supply complete network topography to all of the optional fixed database MANs. If the illustrated network is used, a specific frequency can be used exclusively for dissemination of the network topography. Autonomous operation implies the lack of a central switching center for administering on-going accounting, metering, authorization or the like, but may include cadence timing for synchronizing signals or other communication to permit at will, unrestricted communication between and among migrating or transitory node devices. It is also not necessary for the system to have nodes capable of all four types of signal propagation. However, the system would operate more efficiently with nodes capable of more than one type because signals travel different distances depending on the way the signal propagates. Another means for the system to work efficiently is to have multiple networks in the system, each having only one type of MAN. This would allow the transport layer to manage data traffic across the different networks (each with different operating characteristics) as it normally does.

All of the migratory nodes are capable of movement, but they can be stationary. For example, migratory node 107 is in a car traveling north toward its destination in the vicinity of migratory node 108. The car must stop to refuel before it reaches its destination. The driver must stop to eat (or pick up food) before reaching its destination. The car sits stationary when the driver sleeps. Additionally, it can be expected that the car will be stationary a large portion of the time when it is in its home region due to the driver sleeping, eating and working. During this time, however, the migratory node may periodically report its position, e.g., every one to five minutes, to a regional database, which maintains current node position mapping data. Such node position mapping data are used by other nodes in determining a node-to-node path to a destination.

The fixed regional database node 106 has a database that is capable of enabling determination of end-to-end packet or node routes between a source and destination MAN. They are used when an individual MAN cannot obtain enough information about the network to determine end-to-end routes itself. In the illustrated embodiment, regional database node 106 does not actively acquire node position information, but instead, periodically receives such position information that is automatically and periodically transmitted by MANs within its region. Alternatively, regional database node could be programmed to actively acquire MAN position information by eliciting responses from MANs within its region. When lying beyond an effective communication range, a MAN may also be equipped with a routine that effects relay of position information to an assigned regional database node. The regional databases may also intercommunicate among themselves to exchange database information so that each one maintains "global" position information relative to node in the respective regions of all intercommunicating regional databases.

A routing MAN, on the other hand, traverses a predetermined geographical area (e.g., Zone 1) collecting network information to be disseminated to individual MANs, so they can determine end-to-end routes independently. The fixed regional database node collects network information for a geographical area (e.g., zone 1) from MANs passing within communication range. The fixed database node can disseminate its information and determine routes itself. The routing mobile node can work in coordination with the fixed regional database node collecting network information and relaying it to the fixed regional database node to increase efficiency.

Figure 2:
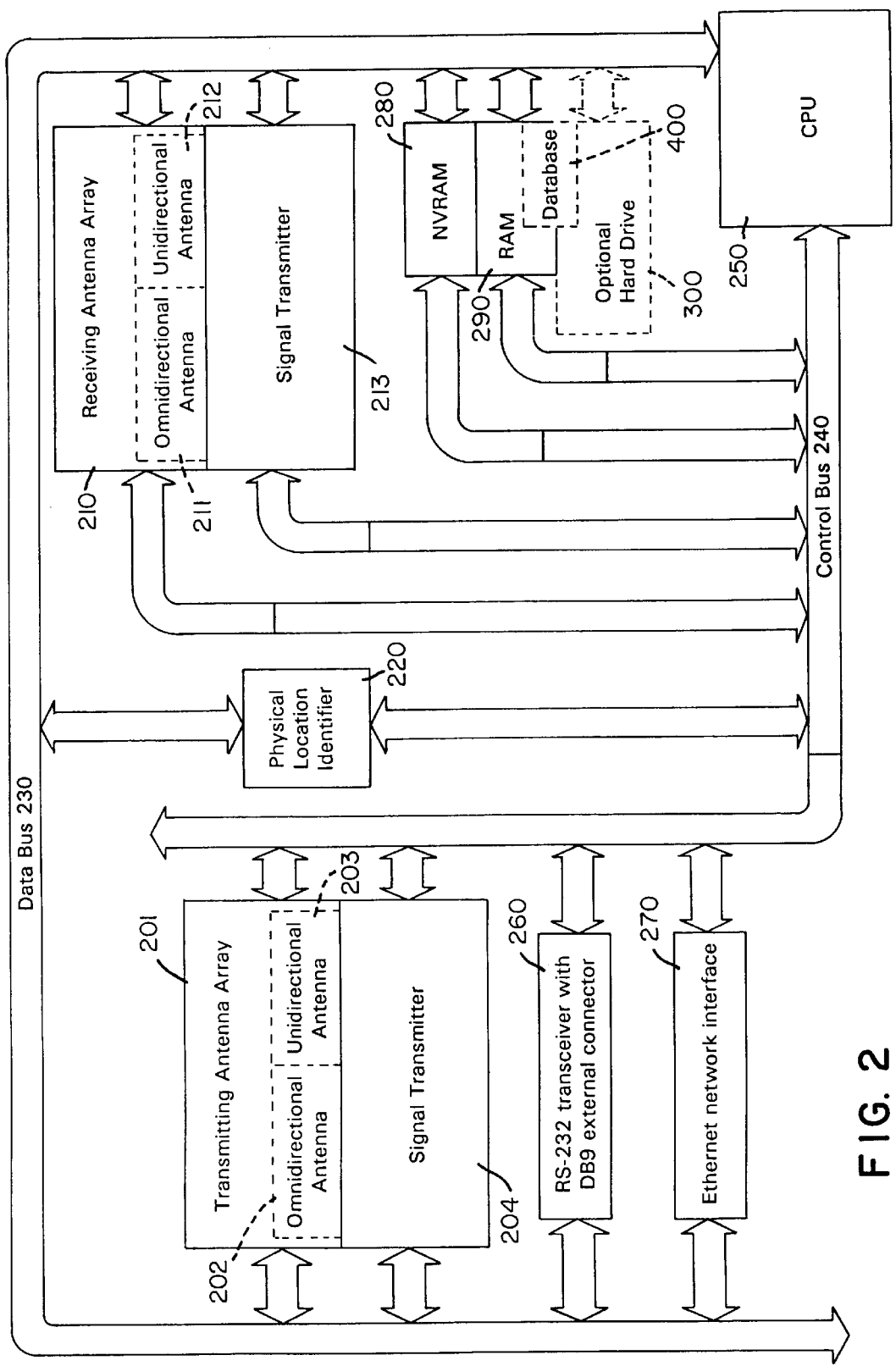
FIG. 2 is a simplified block diagram of a migratory node 200, which includes computation means, signal transmission and reception means, physical location identification means, user interface and memory.

Referring to FIG. 2, a simplified block diagram of a migratory node 200 is shown. The migratory access node has a signal transmitter 204, signal receiver 213, transmitting antenna array 201, receiving antenna array 210, physical location identifier (PLI) 220, central processing unit (CPU) 250, data bus 230, control bus 240, RS-232 transceiver 260, network interface 270, random access memory 290(RAM), non-volatile RAM (NVRAM) 280 having an optional database 400 and an optional hard drive 300 having an optional database 400. The migratory access node may have a multitude of other interfaces as well, e.g., FDDI, token ring, ATM.

The CPU 250 via the control bus 240 controls the signal transmitter 204.

Data is passed to and from the signal transmitter via the data bus 230. The signal transmitter 204, being controlled by the CPU 250, is capable of transmitting at different predefined frequencies, different signal strengths, and/or operating under different air interface protocols . The signal strength is generally classified by signal to noise ratio (S/N). There are other techniques to classify signal strength which are obvious to an artisan of ordinary skill in the art, e.g., monitor bit error rate (BER) at the receiver. The receiver would use the BER to determine power requirements for communication back to the signal transmitter. BER information can be relayed back to the transmitter, so it can use the BER information to determine its power requirements when communicating back to that particular MAN. BER is inversely related to signal strength, as signal strength decreases BER increases.

The signal transmitter 204 supplies a transmission signal to the transmitting antenna array 201, so it can emit a radio wave. The CPU 250 controls the transmitting antenna array via the control bus 240. The migratory node is capable of transmitting signals either unidirectionally and/or omnidirectionally. There are omnidirectional and unidirectional antennas 202 and 203 respectively in the transmitting antenna array 201, which transmit signals. Feedback data e.g. antenna direction is sent to the CPU 250 through the data bus 230.

The CPU 250 via the control bus 240 controls the signal receiver 213. Data is passed to and from the signal receiver via the data bus 230. The signal receiver 213, being controlled by the CPU 250, is capable of receiving different predefined frequencies. Additionally, it is capable of identifying the signal strength of received signals. The signal strength is generally classified by S/N just like the signal transmitter 204. The signal receiver in combination with the receiving antenna array 210 can include circuitry to locate and track incoming signals, thereby tracking moving MANs via incoming packets or signals.

The receiving antenna array 210 supplies a captured radio signal to the signal receiver 213 for processing. The CPU 250 controls the receiving antenna array through the control bus 240. Data flows to and from the receiving antenna array 210 via the data bus 230. There may be two antennas (or other equipment as later described for signal diversity) simultaneously feeding signals to the signal receiver 213 for signal diversity to increase S/N to overcome signal fading. There are unidirectional and omnidirectional antennas 212 and 211 respectively within the receiving antenna array 210.

The CPU 250 through the control bus 240 controls the physical location identifier (PLI) 220. Data is passed to and from the PLI 220 via the data bus 230. Using GPS or other geolocation systems, the PLI identifies the location of the migratory node in at least two planes (parameters). However, three identifying parameters are optimal. The identifying parameters are at least the longitude and latitude of the migratory node with an optional elevation parameter. Polar location parameters indicative of angular and radial displacements may also be employed to locate a MAN. The elevation parameter is only optional in portions of the mobile access system, which are essentially on flat terrain.

Data and control signals to and from the CPU 250 travel across the data bus 230 and control bus 240 respectively. The CPU controls the RS-232 transceiver 260, network interface 270 (and any other network interface), signal transmitter 204 in combination with the transmitting antenna array 201 (transmitting combination), the signal receiver 213 in combination with the receiving antenna array 210 (receiving combination) and the physical location identifier 220. Additionally, the CPU controls memory access to the NVRAM 280, RAM 290 and the optional hard drive 300 and the optional database 400 residing therein. It can instruct the transmitting combination to transmit at different frequencies, under different air interface protocols, transmit unidirectionally or omnidirectionally, or transmit at different signal strengths. It controls the signal combination of the spatial diversity feature, which frequencies are listened to, and which antennas are listened to for the receiving combination and any tracking features that are enabled. The CPU generates packets to be transmitted and passes them on to the signal transmitter 204. The CPU 250 receives the physical location from the PLI 220 and calculates a velocity vector describing the expected path of the migratory node. It takes signal transmission information and determines the expected signal range with a predetermined signal strength or quality. The CPU determines the possible transmitting and optionally the receiving frequencies. In certain instances the computing means determines if it has a routing server token that serves to make routing decisions.

B. RF Communication Link

Traffic in voice and data networks can be classified as long haul, e.g. long distance phone call or communication with a remote computer on the other side of a continent, or short haul, e.g. local phone call or communication with a local server or a computer in a room next door. The distances between long and short haul can generally be serviced by the techniques used by either short haul or long haul.

Migratory nodes 104 are capable of mainly line of sight communication plus ten to fifteen percent. They operate in the 900 MHz or 1800 MHz frequency bands. Higher or lower frequencies could be used to obtain wider bandwidth. However, as the frequency goes higher, the effects of interference increase (e.g. rain attenuation), so there is a tradeoff for greater bandwidth. Most of the system is made up of these migratory nodes because most traffic is localized and requires higher bandwidth. Due to the localized characteristics of communication in these frequency bands, frequency reuse is practical, thereby better utilizing an allocated frequency spectrum. Additionally, there are many commercial transponders available in these frequency bands. The MANs are capable of switching frequencies automatically, so they can optimize performance pursuant to current network conditions.

Line-of-sight signal propagation is not capable of over-the-horizon propagation unless the transmit antenna is high enough to see the reception antenna over the horizon. It is impractical to have antennas tall enough to see over the horizon on moving MANs, so line-of-sight signal propagation can only be used for localized communication in relatively unobstructed environments. The higher the frequency the greater the bandwidth. This mode of signal propagation is well suited for only short range to mid-range communication links with high bandwidth. Therefore, multiple modes of signal propagation will increase the systems efficiency and usability.

Surface wave signal propagation relies upon signal diffraction using the earth as a waveguide, so the longer the wavelength the further the signal can travel due to diffraction. However, the longer the wavelength the lower the frequency and the narrower the bandwidth for data throughput. Therefore, mid-range to very long range (over-the-horizon) work best with this mode of signal propagation.

Tropospheric scatter signal propagation relies upon the earth's troposphere to scatter the signal. This mode of signal propagation works best in the ultra-high-frequency (UHF) and super-high-frequency (SHF) bands (300 MHz to 30 GHz). Therefore, long range to very long range (over-the-horizon) would work best with this mode of signal propagation.

Skywave (ionospheric) signal propagation relies upon refraction in the earth's atmosphere. It is dependent on the incidence angle and the angle of refraction. The incidence angle must be nearly 90$^0$ and some of the signal energy is lost due the fact that not all of the energy is refracted and some just passes through the atmosphere. Basically, the signal is sent almost straight up in the air and it bounces back reaching any area that is in sight of the incidence point in the sky. This usually occurs in the high frequency (HF) band (three to thirty MHz). Skywave signal propagation is very dependent on ionosphere activity. More specifically, its effectiveness depends on the time of day, time of solar cycle and sun activity, which are described in widely available maximum usable frequency (MUF) charts. There are many software packages that calculate MUF also. A sounder (e.g. Digisonde™ Portable Sounder) can be included in the MAN to determine the real-time on-site characterization of signal propagation. Local to long-range communications work best using this type of signal propagation.

Unidirectional (or just directional) antennas benefit the line-of-sight migratory nodes the most, but all of the migratory nodes benefit from the use of directional antennas. Unidirectional antennas are used to cut down on interference between migratory nodes, which are close to each other. In this way, signal transmission can be limited to a targeted area and signal reception can be limited to signals coming from one direction or area. There will be high densities of line-of-sight nodes (especially in or near cities), so these nodes will benefit the most from the unidirectional antennas. Transponders operating at these frequencies perform the best in unobstructed terrain, so the ability to target for a signal is very beneficial. Furthermore, if the system integrated a sub-system to track destination nodes, a directionally controlled antenna with a very narrow coverage window could be used.

Signal diversity is very important in the present invention, since both the transmitting and receiving migratory nodes may be moving. A signal diversity scheme combines multiple uncorrelated signals to obtain a stronger resulting signal to overcome signal fading. These schemes work because multiple paths rarely have the same deep fades, so when combined, the resulting signal has minimal or no fades (higher S/N). The present invention utilizes several diversity schemes. A space or spatial diversity scheme is the easiest and cheapest diversity scheme to implement, so most of the migratory nodes in the present invention utilize spatial diversity. Field component diversity schemes provide all the attributes of the spatial diversity schemes without the large antenna spacing required at low frequencies. Field component diversity is generally used when spatial diversity is impractical. However, the present invention also utilizes polarization, field-component, angular, time or frequency diversity schemes.

Spatial diversity uses two reception antennas separated by a distance equal to about half of the wavelength. The instantaneous received signal strengths at the two antennas are different and uncorrelated. The signals from the two antennas are combined to obtain a stronger resulting signal. It is easy to see that this approach is best suited to short wavelengths, since the distance between antennas should be about half the wavelength. If compactness is a major concern, it would be more appropriate to implement one of the other following diversity schemes.

Field component diversity combines the three field components, electric field component in the z-direction (E.), magnetic field component in the x-direction (Hx), and the magnetic field component in the y-direction (Hy), of a loop to or dipole antenna either coherently (equation a), incoherently (equation b) or the addition of the squares of the individual terms of the coherent combination (equation c).

$$V_I = E_z + H_x + H_y \quad \text{equation a}$$

$$V_{II} = |E_z| + |H_x| + |H_y| \quad \text{equation b}$$

$$V_{III} = |E_z|^2 + |H_x|^2 + |H_y|^2 \quad \text{equation c}$$

This approach uses an energy density or uncorrelated signal antenna receiving the three field components separately. The transmitting antenna can be of any type.

Polarization diversity can be achieved by installing a right and left circular receive antennas. These receive antennas can be on the same mast or support, so this diversity scheme could require less room depending on the frequency used. A whip antenna works the best for a transmitting antenna, so this technique requires three antennas. However the antennas may be closely spaced. In this way, the received signal from each loop antenna is optimally uncorrelated with respect to the others. Another way to implement this diversity scheme is to use a vertical whip antenna and a whip antenna at a 45° angle to receive the signals. Again, the transmitting antenna can use the vertical whip antenna. The two different antennas receive signals with different amplitude and phase. This requires the migratory nodes to have two antennas, but they can be closely spaced.

Angular diversity uses multiple directive (unidirectional) antennas pointing at widely different angles. The present invention uses three directive antennas separated by 120° angles, thereby covering 360°. The multiple antennas isolate different uncorrelated angular components of the signal. Any transmit antenna can be used in this scheme. This diversity scheme uses multiple antennas, which can be closely located, so this technique will work well when conserving space is a consideration.

Time diversity is a fairly inefficient technique because it requires the periodic retransmission of a signal using up valuable bandwidth, so this technique would seldom be used. However this technique does not require separate or special antennas to implement, so it is advantageous when limited space is a major concern.

Frequency diversity requires two radio signals each with a carrier frequency far apart from the other. The widely separated carriers provide uncorrelated signals. This technique uses two signals, so the bandwidth is used inefficiently here also.

C. Communication Protocols

The following descriptions illustrate the minimal implementation of a working network of the present invention. As one can discern, the packet structures and their processing combine the data link and network layers. The data link layer normally provides reliable exchange of data between any two nodes in a network. The network layer normally provides routing, sequencing, logical channel control, flow control and error recovery across a network. Flow control includes throughput, a quality described by quality of service (QOS). QOS per se is normally addressed in the transport layer, but the present invention addresses QOS at lower layers to reduce overhead introduced by going up and down the protocol stack. A requested QOS is likely to require re-negotiation due to fluctuations in quality of received signals. All MANs in the present invention are capable of simultaneous uncoordinated movement, so signal quality is expected to vary greatly at certain times. Additionally, multimedia and video applications place extreme demands on networks. However, it is expected that QOS will still be handled in the transport layer because it addresses QOS between different networks when multiple networks are traversed.

Transmission control protocol (TCP) may be used at the transport layer protocol, but this may require a more robust protocol implementation than that illustrated here depending on the library or software package used to implement TCP. The interface between TCP and the network/link layer will mainly perform translation of the IP addresses specified in the TCP packet to MNIDs, ensure data will fit into the data portion of the TCP packet, and arrange the order of incoming packets according to the order of which they were sent. Since most applications currently rely upon TCP, it is a preferred candidate for the transport layer.

However, the user datagram protocol (UDP) may be used at the transport layer protocol. UDP, however, does not guarantee in order delivery of packets as does TCP.

Perhaps a better solution (at least as far as application programmers are concerned) is to more closely follow the tradition seven-layered OSI approach with established protocols. In this way, users can chose any protocol library or software package to utilize a system made according to the present invention.

Application programmers are usually concerned with layers above the network layer, since packets at the endpoints must traverse the upper layers (transport layer to the application layer) to get to and from the applications on the nodes at the endpoints. The present invention may use AX.25 protocol (hereby included by reference) for its data link (link layer control) layer. AX.25 is the Amateur Packet-Radio link layer protocol. It is similar to the high level data link control protocol (HDLC) and is based on the X.25 layer two protocol. AX.25 is intended for amateur packet radio. Therefore, the addresses are call signs. The call signs are translated from IP addresses (and visa versa). The present invention performs a similar translation from an IP address to MNID (and visa versa), so the same mechanism is used to perform this translation. The AX.25 information packets distribute trajectory vectors.

The use of the AX.25 protocol does not provide any network layer support, so internet protocol (IP) is used for layer three (network layer) services. One may refer to RFC 1226 for further information on IP encapsulation of AX.25 frames (hereby incorporated by reference). Most likely the transport control protocol (TCP) will be used for network services since it provides in-order packet guarantees. Most current network applications rely upon TCP/IP being used, so the AX.25 protocol approach facilitates broader use of the present invention by allowing a user to use off-the-shelf protocol libraries or software packages.

D. Packet Structure of a First Embodiment

There are two embodiments of the present invention described here, although many others may be drawn from this disclosure. Each embodiment has slightly different packets and packet structure. In its simplest form, a source node of the first embodiment need not know or calculate a node-to-node route to a destination node. This is sufficient when the network is expected to be operated within confined boundaries, such as on an island, a campus, or other geographically bounded region. In that case, for example, a source node may broadcast a network packet and all nodes receiving the packet will either capture, respond or forward that packet depending on the nature of the ID, control, and/or information content. In some cases, it may even be unnecessary for the network packet to contain position information, much like that of amateur packet radio techniques, because the region of operation is so small that all node are within communication range or only a few hops within such range. The first embodiment described here does not utilize a database of position information, but does include geolocation means.

Figure 3:
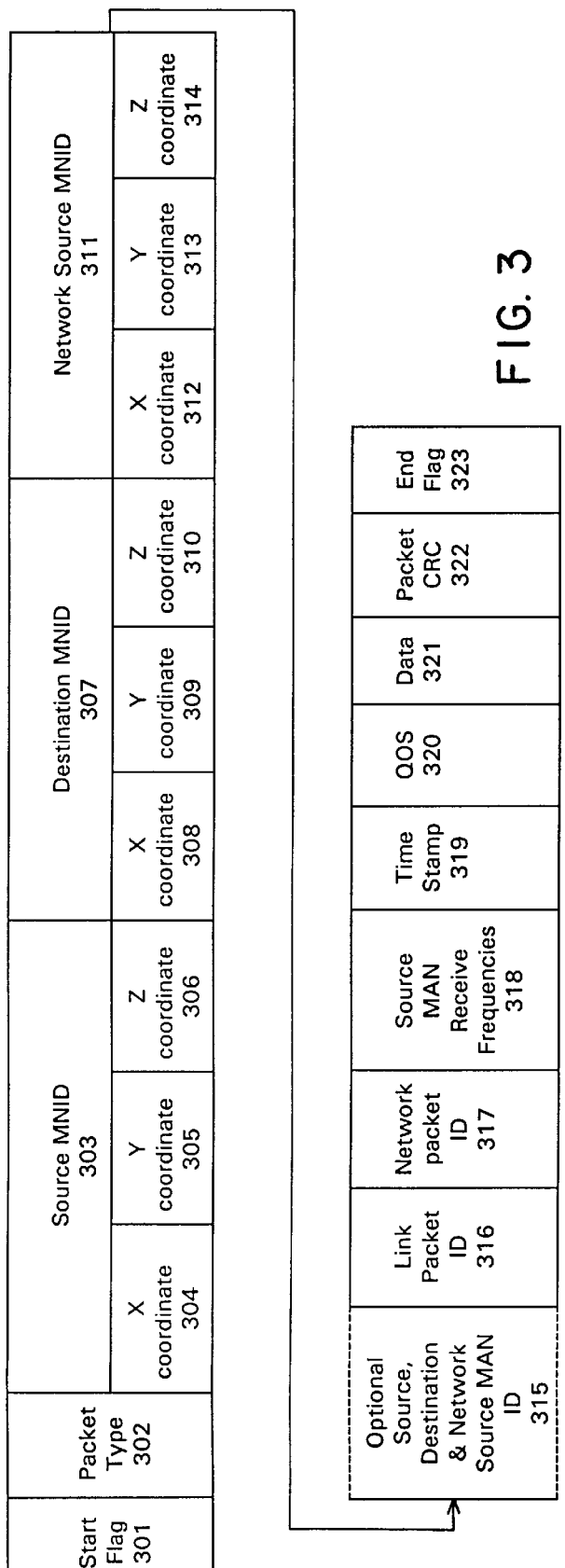
FIG. 3 illustrates a data packet 300 of a first embodiment of the invention.

FIG. 3 identifies the major fields within a data packet 300, which includes status, control and payload data. Each packet has one-octet (eight bits) start and end flag fields 301 and 323 respectively having the value of 01111110 which are the same, so an end flag can be a start flag for the next packet. The six consecutive ones in the flag force all other instances of six consecutive ones to be broken up, so the flags can still be found as the bits of the packet stream by. This is done with bit stuffing. A zero bit is placed after five consecutive ones at the transmitter, and conversely, they are removed at the receiver.

A four-bit packet type field 302 identifies the packet type. The four bits indicating a data packet are "1111." A source (transmitting migratory access node for this link) migratory access node (MAN) identifier (MNID) field 303 has three sub-fields, an x coordinate field 304, a y coordinate field 305 and a z coordinate field 306. Other fields, e.g., polar location parameters, could also be used to designate the source and destination. The source MNID is the location of the MAN when it transmits the packet. The source MNID is the transmitting MAN for a radio communication link. All MNIDs are made up of the x, y and z coordinates. A destination MNID field 307 has x, y and z coordinate fields 308, 309 and 310 respectively. The destination MNID indicates the intended destination MAN for a particular radio communication link. The destination MNID is all ones when a broadcast is requested. A network source MNID field 311 includes x, y and z coordinate fields 312, 313 and 314 respectively. The network MNID is the MAN initiating the packet traffic on the network (i.e. the call initiator on the network). The x (304, 308 and 312), y (305, 309 and 313) and z (306, 310 and 314) coordinate fields are each 32 bits identifying one of three dimensions to fully identify the migratory access nodes location in three dimensional space. Therefore, each MNID field is twelve octets or 96 bits.

A one-octet or eight-bit link packet ID field 316 is used to identify each particular packet on a radio communication link. Each link packet ID must be unique to any migratory node that might receive the transmitted packet at any instant. The size of the link packet ID can be increased if there is heavy traffic, so there are enough unique numbers for all packets in a particular area. A 32-bit network packet ID field 317 identifies a particular packet from network source MAN to the final MAN. The network packet ID must be unique across the entire network because it may be necessary to traverse the entire network to reach its final destination. A two-octet or sixteen-bit source station receive frequencies field 318 identifies which frequencies the transmitting migratory node (source of packet being acknowledged) monitors for link ACK packets (ACKs Network level ACKs can be transmitted/received at a predetermined frequency across the entire network if the volume of traffic is low, so there is no need to indicate different ACK frequencies for a network ACK packet. Optionally, the information packet can include an optional network ACK frequency which will be used throughout the network for end-to-end acknowledgement of that particular data packet, or different network ACK frequencies can be selected for each leg of the network ACK as it travels to its destination. A two-octet or sixteen-bit time stamp field 319 indicates the time the data packet was transmitted by the network source MAN. A four-bit quality of service (QOS) field 320 indicates the type/quality of service the originating user requested for the end-to-end packet transmission. A varying size data field 321 is the packet payload or the information the originating user wishes to convey to the final destination. A sixteen-bit packet cyclical redundancy check (CRC) field 322 is used to identify and correct packet transmission and reception errors.

Optional MAN IDs may be used in the network. More specifically, an optional source, destination and network source MAN ID field 315 indicates the use of optional MAN IDs in the data packet. Generally, the MAN ID used within the network is an IP address to facilitate address and routing of internet traffic resolution (including reverse addressing and all normal address related functions which are readily apparent to any artisan of ordinary skill in the art). There are numerous MAN ID schemes that would be apparent to an artisan of ordinary skill in the art; e.g., the MAN ID can be a telephone number also. The MAN ID is a unique identification assigned to each MAN, which can aide in identifying a MAN in a congested area or if it has moved.

Additionally, MNIDs can be replaced with the MAN IDs as the identifying characteristic within the MAN. In this case, a database is used to correlate a MANs location with the MAN ID (e.g., IP address).

Figure 4:
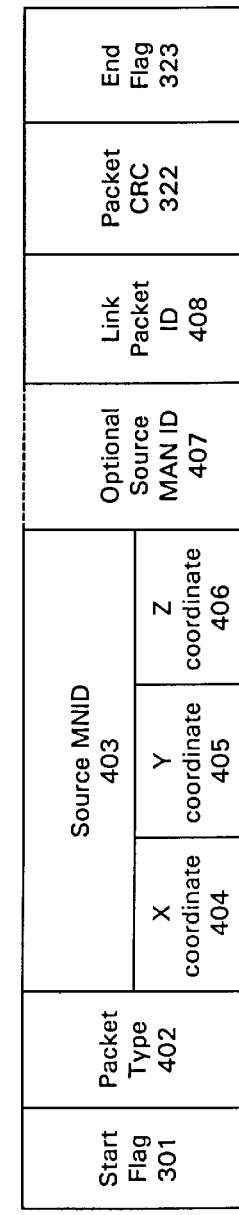
FIG. 4 shows a link acknowledgement (ACK) packet 400 identifying the pertinent fields of the link ACK packet of the first embodiment.

FIG. 4 shows a link acknowledgement (ACK) packet 400 identifying the pertinent fields of the link ACK packet, which include addressing and identification data. The link ACK packet has a start flag field 301 as previously described. A four-bit packet type field 402 identifies the packet type. The four bits indicating a data packet are 1110. A source (transmitting migratory access node for this link) MAN identifier (MNID) field 403 has three sub-fields, a x coordinate field 404, a y coordinate field 405 and a z coordinate field 406. The source MNID is the identifier of the transmitting MAN for a radio communication link as previously described. A one-octet link packet ID field 408 identifies the particular packet on a radio communication link that is being acknowledged. The CRC field 322 and end flag field 323 conclude the link ACK packet fields as previously defined. An ACK can only be responsive to the reception of a good data packet. An optional source MAN ID field 407 can be used as described in the FIG. 3 description.

FIG. 5 identifies the major fields of a network ACK packet 500, which includes addressing and identification data. The purpose of the network ACK packet is for the packet network destination MNID to acknowledge good reception of this particular packet to this packet's network source MNID. The network ACK packet has a start flag field 301 as previously described. A four-bit packet type field 502 identifies the packet type. The four bits indicating a data packet are 1101. A source migratory access node identifier (MNID) field 503 (MAN where packet originated within the network) has three sub-fields, an x coordinate field 504, a y coordinate field 505 and a z coordinate field 506. The source MNID is the transmitting MAN or packet originating point in the network as previously described. A four-octet network packet ID field 508 identifies the particular packet across the network that is being acknowledged. Only a data packet can be acknowledged. The CRC field 322 and end flag field 323 conclude the network ACK packet fields as previously defined. An optional source MAN ID field 507 can be used as described in the FIG. 3 description.

FIG. 6 identifies the major fields of an information packet 600, which includes addressing, location and identification data. The purpose of the information packet is to inform neighboring MANs of the transmitting MANs movement being transmitted at a predetermined frequency. MANs which receive this packet store the new location for the moving MAN. This allows packets sent to the moving MAN to be routed from its location indicated by its MNID (original location) along its movement path thereby finally reaching the destination MAN at its current location. The information packet has a start flag field 301 as previously described. A four-bit packet type field 602 identifies the packet type. The four bits indicating a data packet are 0000. A MNID field 603 (identifying the MAN which is moving) has three sub-fields, an x coordinate field 504, a y coordinate field 505 and a z coordinate field 506 as previously described. A current location field 607 indicates the current location of the MAN at the time of t0 transmitting the packet having the same format as an MNID which has been previously described. The CRC field 322 and end flag fields 323 conclude the network ACK packet fields as previously defined. An optional source MAN ID field 611 can be used as described in the FIG. 3 description.

F. Data Flow Control at Receiver End of the First Embodiment

FIGS. 7A–7D is a flow diagram showing how the present invention processes incoming packets which have been latched into temporary storage (e.g., RAM) corresponding to signals received by the signal receiver 213. The CPU determines the power or quality of received packets as the receiver latches the incoming packets into its internal register. The CPU moves a received packet from the register to a location in RAM for temporary storage when the power or quality of the packet are sufficient. The CPU tries to identify the start and end flags (301 and 323 respectively). If the start and end flags are identified then the beginning and end of a packet have been located. The CPU calculates a CRC for the received packet and then compares it to the CRC in the packet CRC field 322 of the received packet. If the two are equal, then it is highly probable that the received packet is a recognizable packet. The CPU identifies the type of packet that has been received by comparing the packet type field bit pattern in the packet type field to the bit patterns indicating a data packet (1111), a link ACK packet (1110), a network ACK packet (1101), or an information packet (0000).

If the packet type is a link ACK packet 402, then the CPU compares the source MNID field 403 stored in RAM to the MNID written to RAM during initialization. If they are the same (i.e., the packet is intended for this MAN), then the CPU accesses the RAM location storing the packet corresponding to the link packet ID in the link packet ID field 408 and deletes it. This link ACK packet acknowledges good reception of a data packet across a communications link to the data packet's source MAN. If the MNIDs are not the same (i.e., the packet not intended for this MAN) then the CPU continues waiting for packets with sufficient power or quality from the signal receiver. If the optional MAN ID is used, then the CPU can compare the optional source MAN ID field to the MAN ID to determine if the packet is destined for this MAN (useful in congested area or when a MAN is moving).

If the packet type is a network ACK packet 502, then the CPU compares the MNID indicated in the network source MNID field 503 to the receiving MANs MNID. If they are the same (i.e., the packet is intended for this MAN), then the CPU accesses the RAM location storing the packet corresponding to the network packet ID in the network packet ID field 508 and deletes it. This network ACK packet acknowledges good end-to-end reception of a data packet to the data packet's original network source. If the MNIDs are not the same (i.e., the packet is not intended for this MAN) then the CPU switches to a module which generates and transmits a network ACK packet (FIG. 10), thereby perpetuating the network ACK packet to the network source of the packet being ACKed. Subsequently, the CPU continues waiting for packets with sufficient power or quality from the signal receiver. If the optional MAN ID is used, then the CPU can compare the optional source MAN ID field to the MAN ID to determine if the packet is destined for this MAN.

If the packet type is an information packet 602, then the CPU stores the current location in the current location field 607 corresponding to the source MNID in the source MNID field 603 in a lookup table in RAM or on the hard disk if it is available. Subsequently, the CPU continues waiting for packets with sufficient power or quality from the signal receiver.

If the packet type is a data packet 302, then the CPU compares the current time to the timestamp in the timestamp field 319 to determine how old the packet is. If the packet is stale (e.g. older than thirty minutes), the CPU accesses the RAM location storing the data packet and deletes it. Subsequently, the CPU continues to wait for incoming packets with sufficient power or quality. If the data packet is not stale, the CPU moves it to the hard disk if it is available; otherwise, it remains in RAM. The CPU switches to a module, which generates and transmits a link ACK packet 400 (see FIG. 9). The CPU compares the receiving MANs MNID to the MNID in the destination MNID field 307. If they are the same, the data packet has reached its final destination, so the CPU switches to a module, which generates and transmits a network ACK packet 500 (see FIG. 10). Subsequently, the CPU continues to wait for incoming packets with sufficient power or quality.

If the received data packet hasn't reached its destination, it must be retransmitted. The CPU accesses the lookup table in RAM to determine if the destination MAN has an entry in the lookup table. If, the destination MAN has an entry in the lookup table (the MAN has moved), the CPU places the new location for the destination MAN from the lookup table into the destination MNID field of the corresponding packet stored in RAM. The CPU calculates the distance to the destination MAN, after moving the current location (x, y and z coordinates) from a register in the physical location identifier (PLI) to a local register, using the coordinate information in the destination MNID field and the current location in the local register. The CPU initializes an auto-retransmit counter (e.g. set to three tries). The CPU determines if the QOS field 320 indicates that the quality of service can be low bandwidth or high latency. If the OOS indicates that QOS must be of better quality than low bandwidth or high latency, the data packet is transmitted with CDMA techniques, if the receiving MAN is capable of it. Otherwise, the CPU reads the configuration information to determine 701 if the MAN has a unidirectional antenna (continuing as later described with respect to conditional block 701). Additionally, if the receiving MAN is not capable of CDMA transmission techniques, the next step is to check for a unidirectional antenna in the conditional block 701 also (continuing processing as later explained).

The CPU looks up the receiving MAN in a lookup table to determine if it is in a high MAN density area (this step is optional, but can provide better performance). The more MANs in an area, the greater the probability of interference, so unidirectional transmit antennas help reduce stray signals. The CPU reads the MAN configuration data in RAM to determine which types of antennas are available. If a transmit unidirectional antenna is not available, the CPU calculates the signal transmission power requirements as depicted in block 702. Subsequent processing is later described with respect to block 702.

If a unidirectional transmit antenna is available; a unidirectional antenna transmission process can be performed as follows. The CPU determines the distance to the destination MAN using the MAN's current location, read from a register in the PLI, and the destination MAN's MNID or location. If the distance is greater than the distance (e.g., fifty miles) a signal can be expected to travel with good signal characteristics (e.g., sufficient power or S/N), then the distance is set to fifty miles for signal transmission calculations, otherwise the distance is left at its true value. In this way intermediate hops/links can be set up and executed. The power necessary to transmit the signal a radius of the previously determined distance with good signal quality (e.g., sufficient power or S/N, e.g., S/N between −5 and 10 dB) is calculated. The CPU calculates the direction to the destination MAN and moves the antenna to point in this direction. The CPU moves the data packet that was stored in RAM to a register in the transmitter transmitting the packet. The CPU initializes and starts an auto-retransmit countdown. The CPU waits for a link ACK packet corresponding to the transmitted data packet (i.e. the packet ID in the data packet matches the packet ID in the link ACK packet) to arrive at a transmitter register as previously described.

If a link ACK packet corresponding to the data packet is received, the receive algorithm starts over again with the CPU waiting for incoming packets from a register in the receiver. Otherwise, the CPU keeps waiting for a corresponding link ACK until the link auto-retransmit timer expires. Subsequently, the CPU tries to transmit the packet with the omnidirectional antenna, if one is available. In this manner the MAN can communicate with any adjacent MANs within signal range. If an omnidirectional antenna is not available, the directional antenna is rotated to the next angle if it hasn't rotated a full 360° yet, thereby still communicating with adjacent MANs within signal range. The data packet is sequentially transmitted again as previously described. Once the antenna has been rotated 3600, the transmission distance is decreased by ten miles for signal transmission calculations. The power calculation and signal transmission is repeated as previously described. The distance is iteratively to decreased by ten miles repeating the power calculation and signal transmission process until a responsive link ACK is received or the distance is no longer greater than zero.

If the CPU determines that a unidirectional transmission antenna is available in conditional block 701, then the previously described unidirectional antenna signal transmission procedure can be used. Otherwise, the CPU calculates the power necessary to transmit a good signal (e.g., a signal with S/N between −5 and 10 dB) the specified distance. The data packet 300 is transmitted and an auto-retransmit countdown timer is initialized and started as previously described. The reception algorithm starts over, i.e.; the CPU waits for new incoming packets via the receiver as described above, if a responsive link ACK packet is received. Otherwise, the CPU waits for a link ACK packet responsive to the transmitted data packet (i.e. link ACK with a link packet ID 408 equal to link packet ID 316) until the auto-retransmit timer expires. When the auto-retransmit timer expires, the distance is decreased by ten miles, and then the signal transmission process is repeated as previously described. The process of decreasing the transmission distance, calculating the necessary power and transmitting the packet is repeated until either a link ACK packet responsive to the transmitted data packet is received or the adjusted distance is no longer positive.

If the packet type of the received packet is not one of the recognized types, then it is logged for possible further analysis. Subsequently, the CPU continues waiting for signals from the receiver as described above.

G. Data Flow Control at Transmitter End of the First Embodiment

Figure 8:
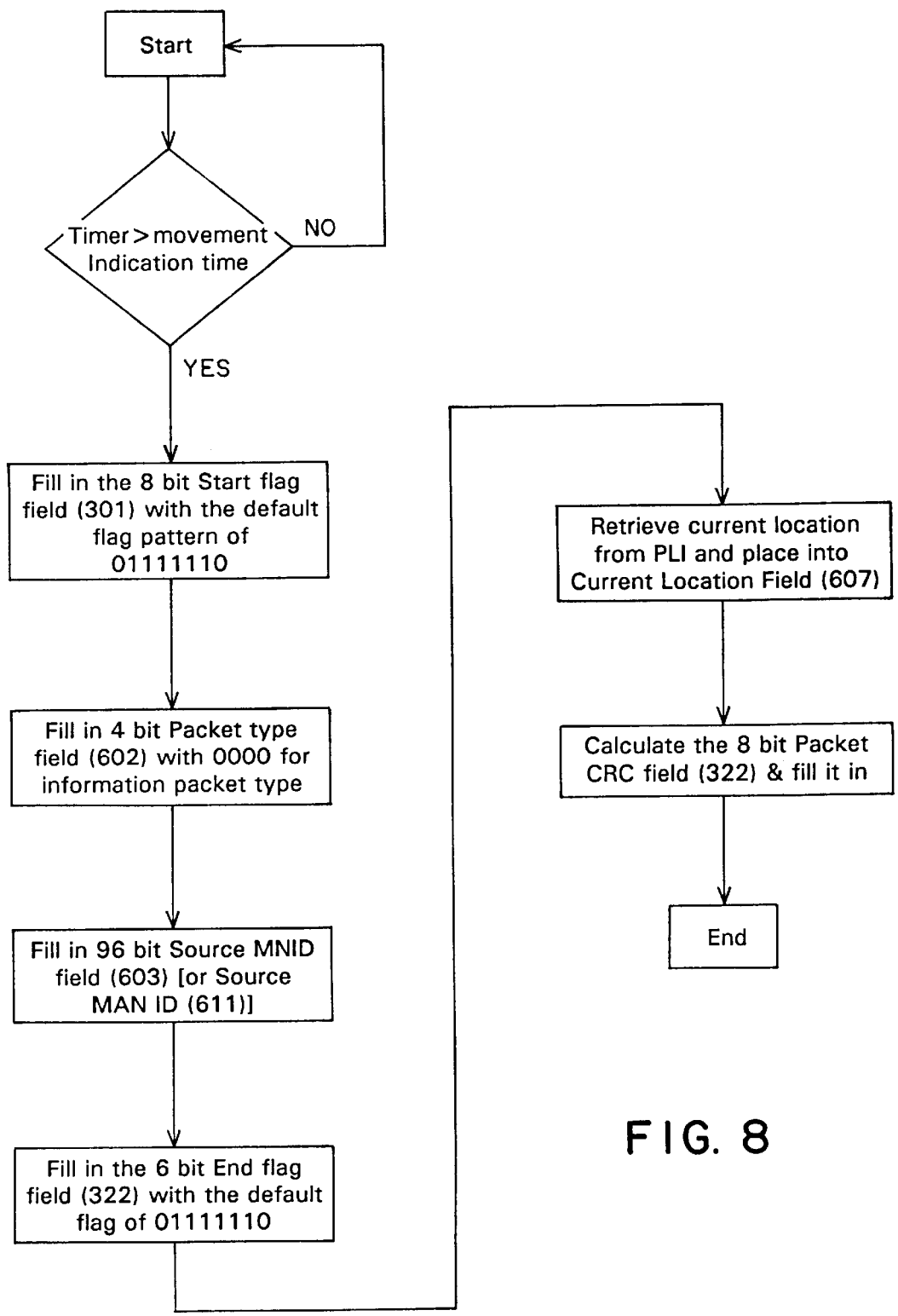
FIG. 8 shows an information packet 800 identifying the major fields within an information packet of the first embodiment.

FIG. 8 shows a flow diagram demonstrating data flow with respect to the information packet 600 being transmitted by a MAN when it is moving to inform neighboring MANs of its new position as it moves. The CPU assembles an information packet in RAM by assessing data and subsequently assembling all of the packet field data in RAM, thereby generating a complete information packet (FIG. 6) in RAM which can be moved to a register in the transmitter for subsequent transmission. The CPU determines if the MAN has moved since the last information packet transmission. If the MAN has moved, the CPU determines if a movement indication timer has expired, indicating it is time to is transmit the current location. The CPU continues checking the timer until it has expired. The CPU normally executes other modules between timer checks. The CPU writes a bit pattern of 01111110 into the eight-bit start flag field 301 area in RAM. The CPU writes a bit pattern of 0000 into the packet type field 602 area in RAM. The CPU reads RAM corresponding to the 96-bit source MNID value set at initialization. The CPU writes the retrieved source MNID value into the RAM location corresponding to the source MNID field 603. The CPU writes a bit pattern of 01111110 into the end flag field 323. The CPU reads the current location from a register in the PLI and writes it into RAM corresponding to the current location field 607. Lastly, the CPU calculates the CRC, using zeros for the CRC value in the calculation, for the information packet and writes it into RAM corresponding to the packet CRC field 322.

Figure 9:
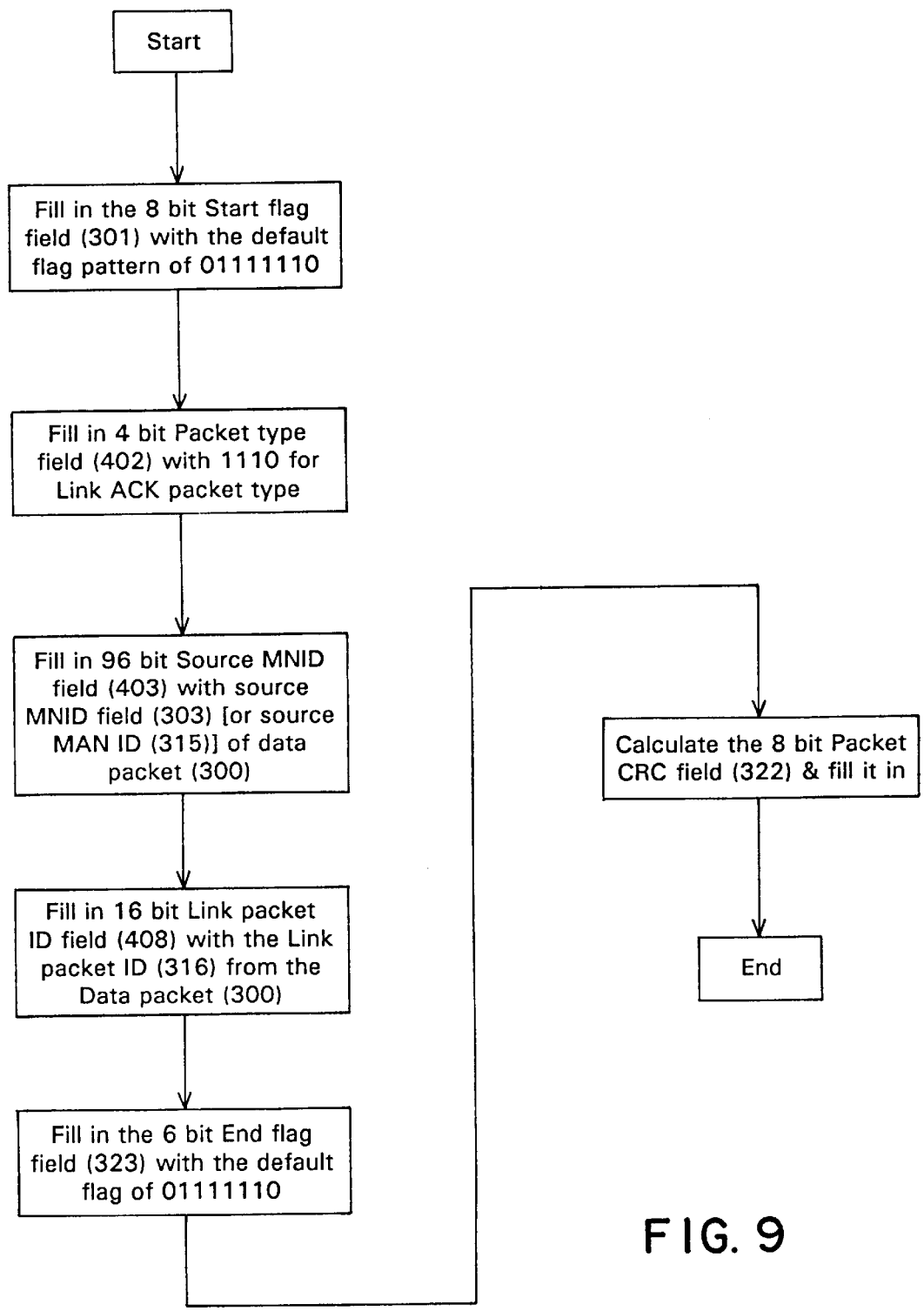
FIG. 9 shows a flow diagram demonstrating data flow with respect to the link ACK packet 400 of the first embodiment.

FIG. 9 shows a flow diagram demonstrating data flow with respect to the link ACK packet 400. The link ACK is transmitted in response to a received data packet 300. The CPU creates a link ACK packet in RAM by determining the field contents and subsequently assembling all of the packet field contents in RAM, thereby generating a complete link ACK packet (FIG. 4) in RAM which can be moved to a register in the transmitter for subsequent transmission. The CPU writes a bit pattern of 01111110 into the eight-bit start flag field 301 area in RAM. The CPU writes a bit pattern of 1110 into the packet type field 402 area in RAM.

The CPU reads the 96-bit source MNID value in the source MNID field 303 from RAM where the previously received data packet 300 is stored. The CPU writes the retrieved source MNID value into the RAM location corresponding to the source MNID field 403. The CPU reads the sixteen-bit link packet ID from RAM corresponding to the stored link packet ID field 315 of the previously received and stored data packet 300. The CPU writes the link packet ID into RAM corresponding to the link packet ID field 408. The CPU writes a bit pattern of 01111110 into the end flag field 323. Lastly, the CPU calculates the CRC, using zeros for the CRC value in the calculation, for the link ACK packet and writes it into RAM corresponding to the packet CRC field 322.

Figure 10:
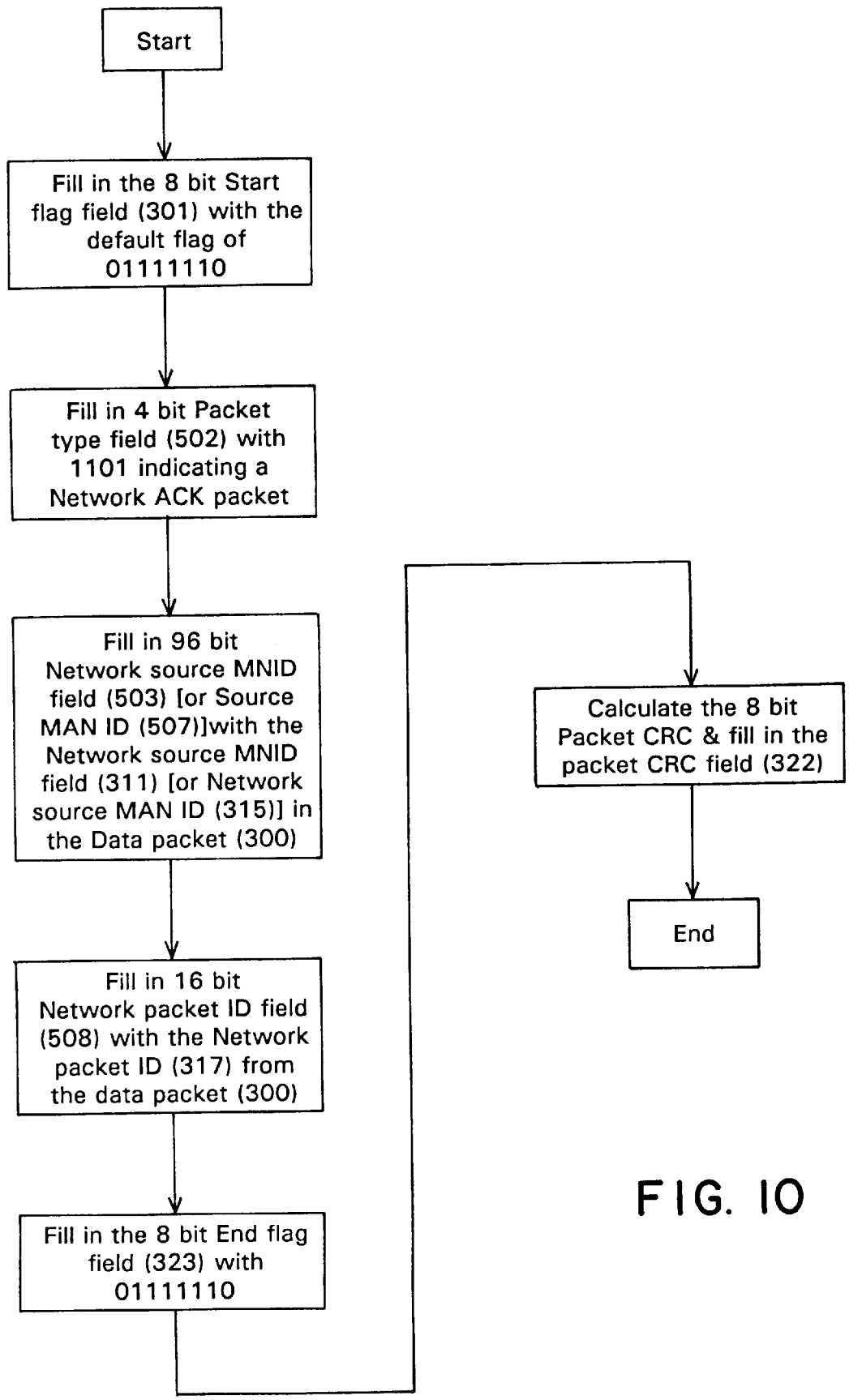
FIG. 10 is a flow diagram describing data flow with respect to the network ACK packet 500 of the first embodiment.

FIG. 10 is a flow diagram describing data flow with respect to the network ACK packet 500. The CPU determines the network ACK packet field contents and assembles them in RAM. The network ACK is transmitted in response to a received data packet 300. The CPU writes a bit pattern of 01111110 into RAM corresponding to the eight-bit start flag field 301. The CPU writes a bit pattern of 1101 into RAM corresponding to the packet type field 502. The CPU reads the 96-bit network source MNID value in RAM corresponding to the network source MNID field 311 from the previously received and stored data packet 300. The CPU writes the retrieved network source MNID value into RAM corresponding to the source MNID field 503. The CPU reads the sixteen-bit network packet ID in RAM corresponding to the network packet ID field 317 of the retrieved data packet 300 and writes it into RAM corresponding to the link packet ID field 508. The CPU writes a bit pattern of 01111110 into RAM corresponding to the end flag field 323. Lastly, the CPU calculates the CRC of the link ACK packet as previously described and writes it into RAM corresponding to the packet CRC field 322.

Figures 1, 11:
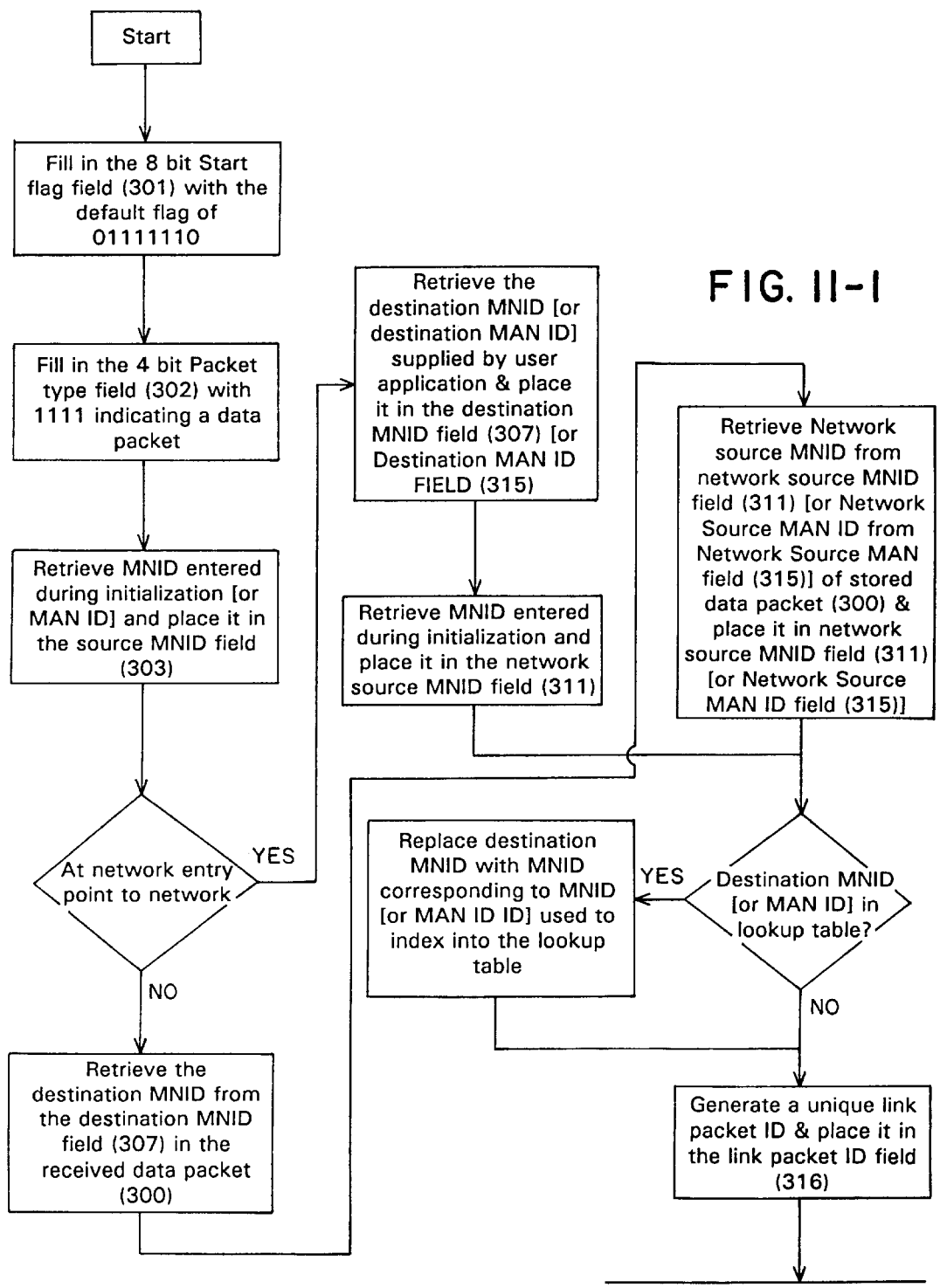
FIG. 11 is a flow diagram describing data flow with respect to the data packet 300 of the first embodiment.
Figures 2, 11:
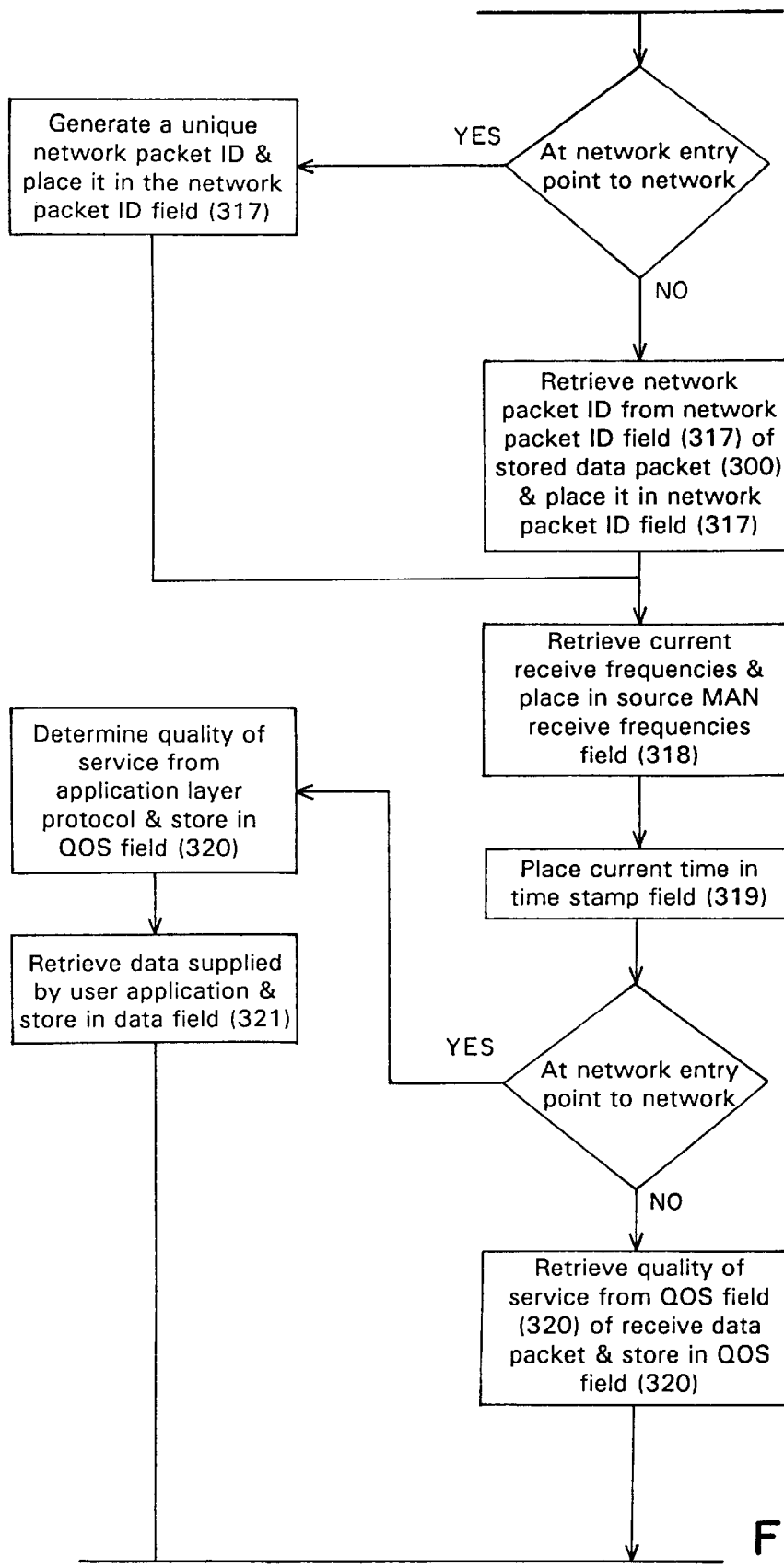
Figures 3, 11:
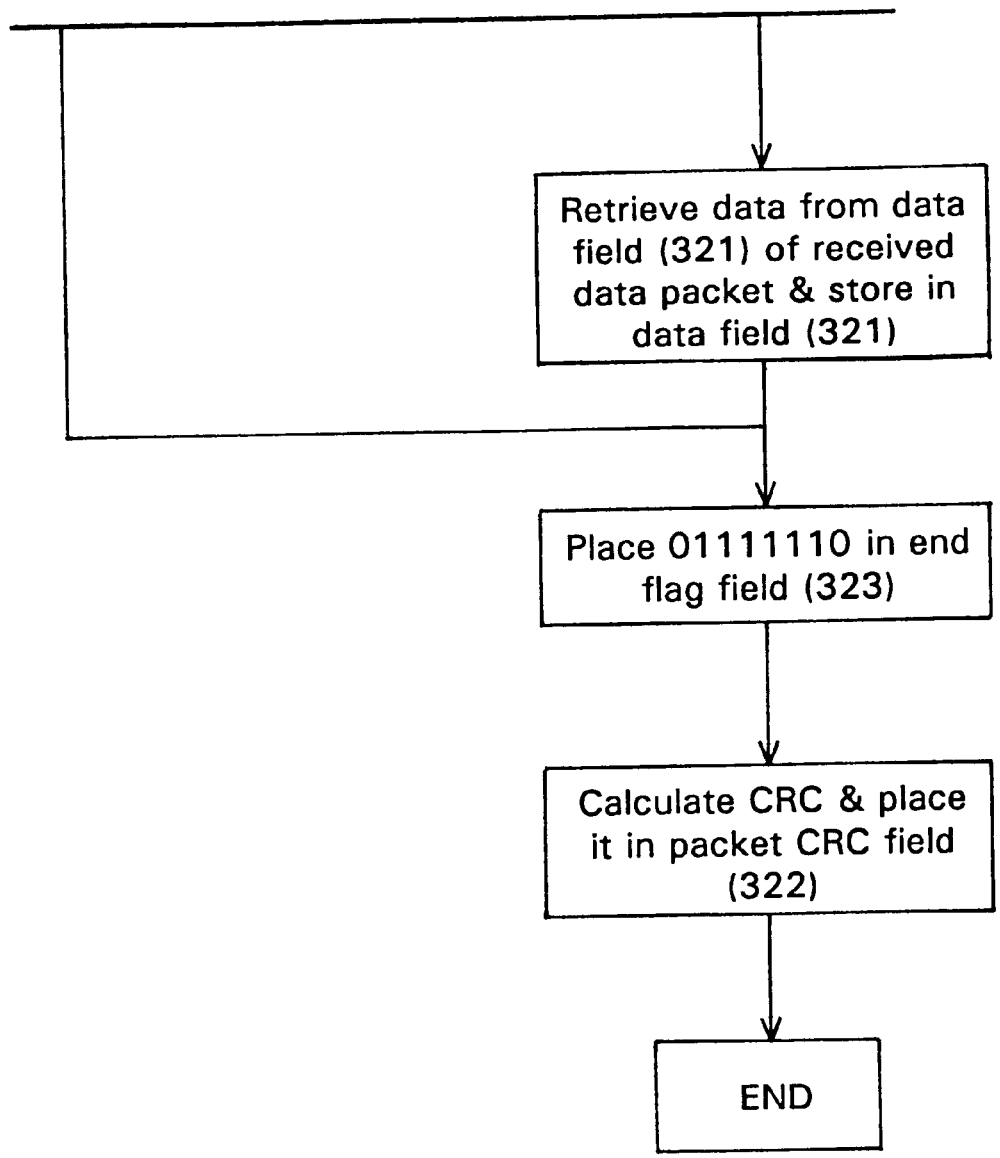

FIG. 11 is a flow diagram describing data flow with respect to the data packet 300. The CPU determines the data packet field contents and assembles them in RAM to generate an entire data packet which can be written to a register in the transmitter for transmission. The data packet is transmitted in response to a received data packet 300 either from another MAN or the packet network entry point. The CPU writes a bit pattern of 01111110 into RAM corresponding to the eight-bit start flag field 301. The CPU writes a bit pattern of 1111 into RAM corresponding to the packet type field 302. The CPU reads the RAM location corresponding to the 96-bit MNID stored into RAM at initialization and writes it into RAM corresponding to the source MNID field 303. The CPU determines which port the packet was received on (e.g., either RS-232 interface, the Ethernet network interface 270, the signal receiver 213 or other interfaces if there are available) to determine if the packet is coming from within the network or from outside of the network, thereby determining if the MAN is on the edge of the network or not. The 96-bit destination MNID is determined differently if the software module providing the communication interface on the RS-232 port does not support TCP/IP. In this case, the CPU must retrieve the destination MNID from the user application. In the present invention, this is not the case, so the CPU reads the destination MNID from RAM corresponding to the destination MNID field 307 of the corresponding previously stored data packet. The CPU looks up the MNID (or MAN ID if it is used) in its lookup table in RAM to determine if the MNID (or MAN ID) is in the lookup table. If the MNID (or MAN ID) is in the lookup table, the CPU writes the corresponding MNID value from the lookup table into RAM corresponding to the destination MNID field 307.

Otherwise, the CPU writes the retrieved destination MNID into RAM corresponding to the destination MNID field 307. The network source MNIDs 311 is determined differently depending on whether the MAN is on the network edge or not. If the MAN is on the edge, the CPU reads RAM corresponding to the MNID entered at initialization and writes it into RAM corresponding to network source MNID field 311. If the MAN is within the mobile network, the CPU reads RAM corresponding to the stored network source MNID field of the previously received data packet and writes it into RAM corresponding to the network source MNID field 311. The CPU calculates a unique link packet ID and writes it into RAM corresponding to the link packet ID field 316. The CPU calculates a unique network packet ID if the MAN is at the network packet entry point; otherwise the CPU reads it from RAM corresponding to the network packet ID field 317 of the previously stored data packet. The network packet ID is written into RAM corresponding to network packet ID field 317. The CPU reads its internal clock and writes the time into RAM corresponding to the time stamp field 319. It may be necessary to obtain the quality of service and data from the user application depending on the software providing communication with the RS-232 port as referred to above. The RS-232 port interface of present invention supports TCP/IP, so the CPU reads RAM corresponding to the QOS and data fields 320 and 321 respectively from the previously stored data packet and writes them into RAM corresponding to QOS and data fields 320 and 321 respectively. The CPU writes a bit pattern of 01111110 into RAM corresponding to the end flag field 323. Lastly, the CPU calculates the data packet CRC, using zeros for the CRC field, and writes it into RAM corresponding to the packet CRC field 322.

H. Packet Structure of the Second Embodiment

Figure 12:
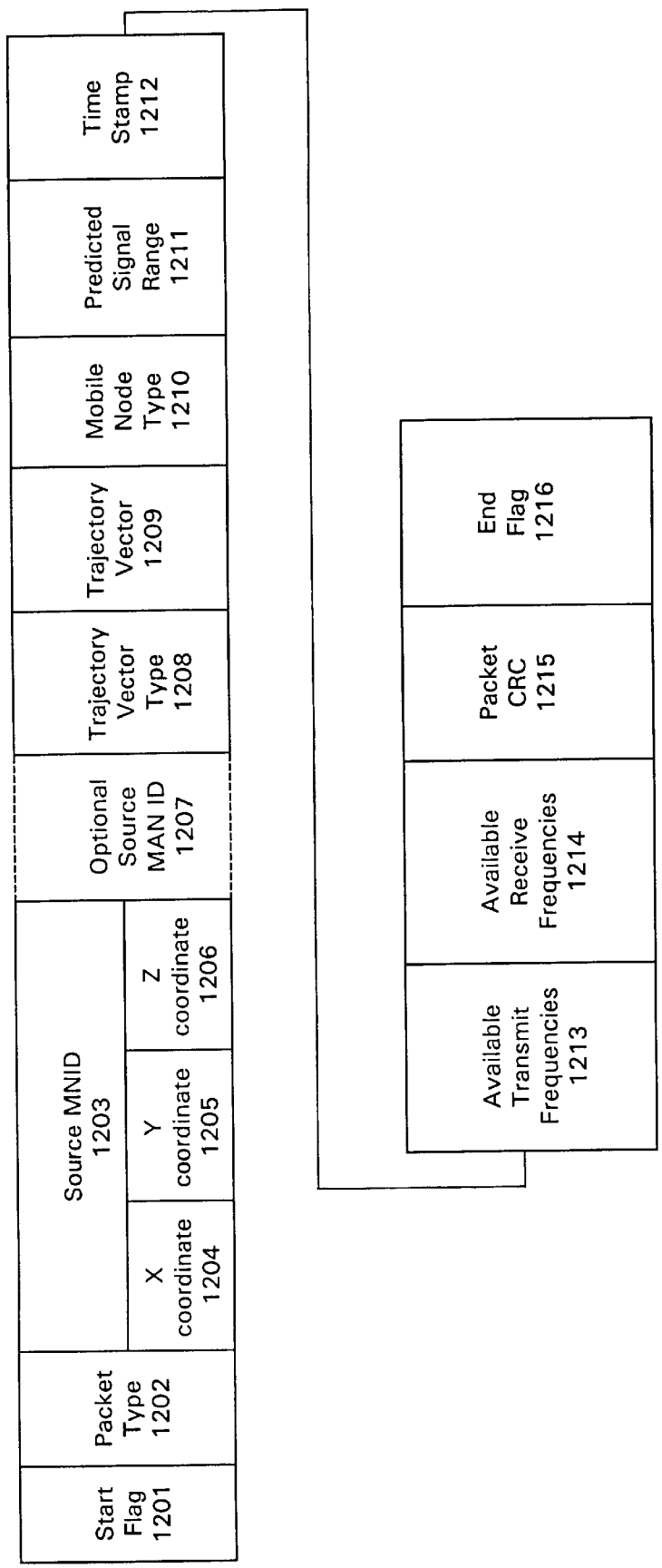
FIG. 12 identifies the pertinent fields within the information packet 1200 of the second embodiment.

FIG. 12 identifies the pertinent fields within the information packet 1200. The second embodiment differs from the first by including methods and systems for collecting and/or distributing a database of node position information so that an originating node, prior to transmission of a message, may determine possible nodal or packet routes to a destination. The database may be regional or global, and may reside locally within MANs, at fixed regional nodes, or at any other location accessible by a source node for computing a node-to-node destination path.

The information packet containing position information is broadcast with a predetermined periodicity to pass along information that is used for routing packets through the network. Each packet has an eight-bit start flag field 1201 having a value of 01111110. A four-bit packet type field 1202 identifies the packet type. The four bits indicating an information packet are 0000. A twelve-octet migratory access node identifier (MNID) field 1203 has three four-octet sub-fields, an x coordinate field 1204, a y coordinate field 1205 and a z coordinate field 1206 as described in the first embodiment. The source MNID is a MAN which is trying to pass along routing information about itself, so other migratory nodes will be able to route packets through it. MNIDs are made up of the x, y and z coordinates.

A four-bit trajectory vector type field 1208 indicates which type of trajectory vector is to be used. The trajectory vector types are roadway, shipping lane, flight path, railway and free (others may be included as well) form having bit patterns of 1111, 1110, 1101, 1100 and 0000 respectively. A variable length trajectory vector field 1209 indicates the trajectory vector of the migratory access node. This field can be extended depending on the type of vector and the accuracy required. A four-bit migratory access node type field 1210 identifies the type of migratory access node. The available migratory access node types are mobile MAN and routing MAN. The migratory access nodeMAN is an access node migrating and trying to pass packets along their specified path and generate routes for packets originating at itself. A routing or relay MAN is a migratory access node moving around or roving in a manner to go around a predefined geographical area collecting information packets to get enough information to be capable of generating routes for packets to flow end-to-end over the network. The routing MANs transmit this information as they travel just as mobile MANs do. The routing MAN is necessary to collect routing information from migratory access nodes within their geographical area which are not close enough to other migratory access nodes (e.g., out of radio transmission/reception range) to pass their routing information along via the standard radio communication techniques. That is, this routing MAN goes out and gets the routing information instead of waiting for routing information to come to it. The routing MAN is not needed in areas, which are fully populated with MANs. It should be noted that routing MANs are capable of receiving packets and storing them as they travel to a new location, subsequently transmitting the stored packets, thereby allowing packets to travel via the routing MAN instead of radio waves. This technique is valuable in areas not fully populated with migratory nodes.

Instead of utilizing roving MANs information, the system may employ fixed or stationary regional databases (106) that capture and keep track of MANS within its district or region.

In this case, the regional database would maintain lookup tables. In order to provide capturing of position information by the regional databases, MANs in a given region periodically or randomly, say from every few seconds to three minutes, would transmit its own geolocation and identification information to a regional database within its region. These regional databases may be tied together via conventional landlines to permit exchange of database information so that each stores "global" position and ID information about all MANs in each region of a multi-regional area. Prior to initiating a transmission, a MAN would check its assigned regional database for the whereabouts of an intended recipient and, based on the information obtained, compute by conventional methods a node-to-node route to the recipient. Alternatively, each MAN may periodically download information from its assigned regional database in order to have that information at hand prior to calculating a node-to-node route to a destination.

Several variations of schemes for providing global position information may be employed. These including using lookup tables containing ID and associated position information derived from a combination of roving MANs and fixed regional databases. Also, each MAN may capture and store locally ID and associated position that is blindly broadcast by autonomously operating MANs in the network. Special routines in a MAN may be invoked by another MAN to search and find via further broadcasts a particular node based on last known position.

In any event, an eight-bit predicted signal range field 1211 identifies the expected signal range with a predetermined signal quality. A sixteen-bit time stamp field 1212 is a time stamp indicating when the fields in the information packet were calculated and posted. An eight-bit available transmit frequencies field 1213 indicates which transmitting frequencies the migratory access node is capable of transmitting at. An eight-bit available receive frequency field 1214 indicates which signal frequencies the migratory access node monitors for signal reception. A sixteen-bit packet cyclic redundancy check (CRC) field 1215 is used to detect and correct transmission and reception errors. A one-octet end flag field 1216 having the value of 01111110 indicates the end of the information packet. It has the same value as the start flag, so the end flag can serve as the start flag of a following packet start flag.

The trajectory vector in combination with the current x, y and z coordinates, the predicted signal range and the time stamp are used to determine when migratory access nodes will be within range of each other to determine an end-to-end packet route from a network source to a network destination. The MANs look at the information packets, and more specifically, the migratory access node type field. If the MAN type field indicates that the information packet came from a routing MAN, then the information is captured and saved, and the packet is retransmitted. In this manner, all MANs will find out which migratory access nodes are the routing MANs as well as where they are and when they will come in contact with them.

Optional MAN IDs may be used in the network. More specifically, an optional source MAN ID field 1207 indicates the use of optional MAN IDs in the information packet. Generally, the MAN ID used within the network is an IP address to facilitate addressing and routing of internet traffic resolution (including reverse addressing and all normal address related functions which are readily apparent to any artisan of normal skill in the art). There are numerous MAN ID schemes that would be apparent to an artisan of ordinary skill in the art; e.g., the MAN ID can be a telephone number also. The MAN ID is a unique identification assigned to each MAN, which can aide in identifying a MAN in a congested area or if it has moved.

Additionally, MNIDs can be replaced with the MAN IDs as the identifying characteristic within the MAN. In this case, a database is used to correlate a MANs location with the MAN ID (e.g., IP address).

Figure 13:
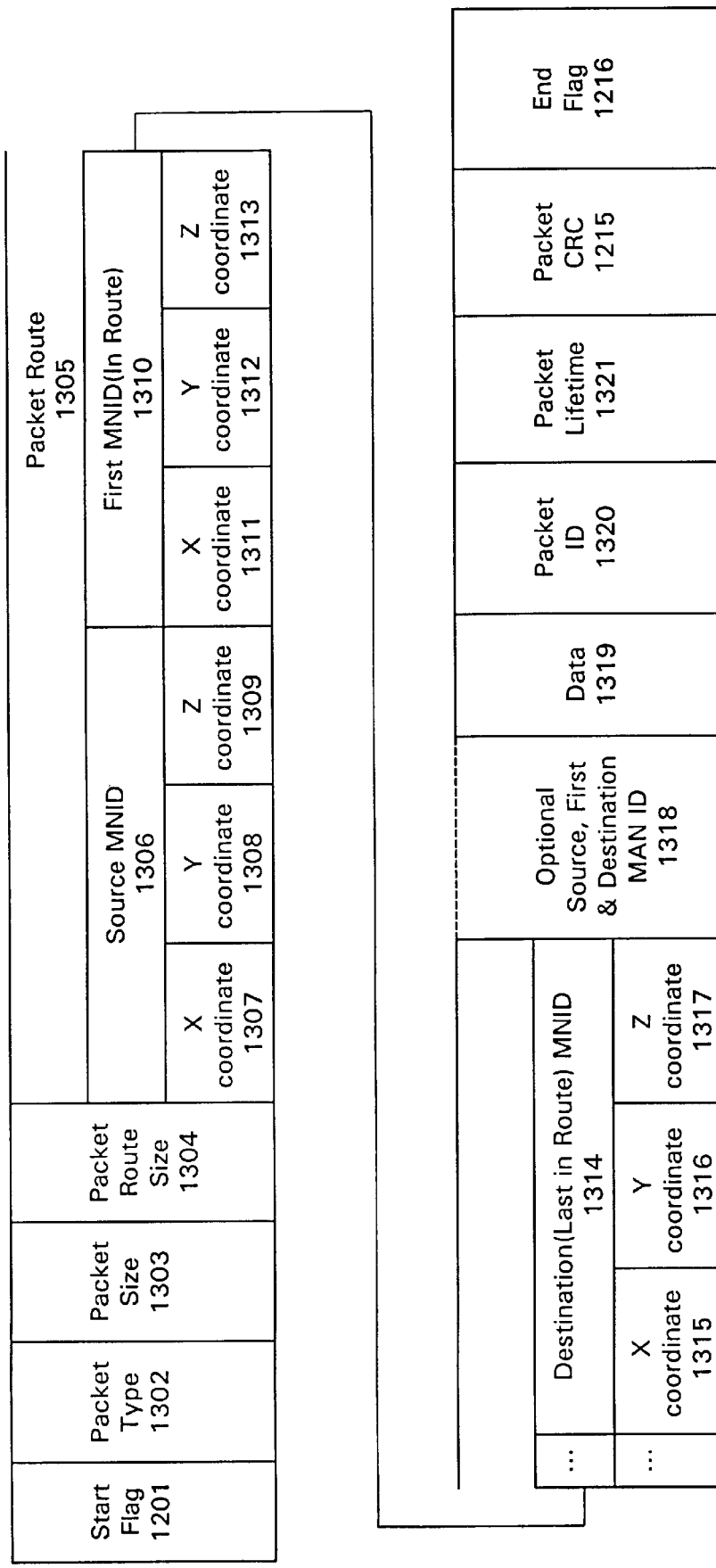
FIG. 13 illustrates a data packet 1300 identifying the pertinent fields within a data packet of the second embodiment.

FIG. 13 illustrates a data packet 1200 identifying the pertinent fields within a data packet. An eight-bit start flag field 1201 indicates the beginning of a new packet in the data flow as previously described. A four-bit packet type field 1302 having a value of 1111 indicates that this packet is a data packet. A sixteen-bit packet size field 1303 indicates the size of the data packet. A packet route field 1305 indicates the end-to-end route the packet will take from source to destination. An eight-bit packet route size field 1304 indicates the size of the packet route field. This field is only required when the size of the data field 1319 is not fixed. The data field is the actual data that is being sent to the destination MAN.

The packet route field 1305 is a concatenation of MNIDs the packet will traverse in the end-to-end packet route. Prior to transmission, the packet route information is obtained from a database of captured network information (i.e., MAN information via captured information packets) by a roaming routing MAN. The specific sequence of concatenated MNIDs is calculated by processor 250 according to a preferred or best route to x, y, z coordinates of respective MANs between the source and destination. A source MNID 1306 indicates the source of the end-to-end transmission. A first MNID field 1310 is the subsequent MNID the packet will traverse, i.e. the source MNID sends the data packet to the first MNID. The first MNID sends the packet to the next MNID, which sends the packet to the next MNID and so on until an MNID sends the packet to the destination MNID. The destination MNID is indicated in a destination MNID field 1314. Each MNID has a four octet x coordinate, four-octet y coordinate and a four octet z coordinate. For example the source MNID field 1306 includes a x coordinate field 1307, a y coordinate field 1308 and a z coordinate field 1309. The other MNIDs in this FIG. are not explicitly described since all MNIDs are the same. The packet route 1305 is a forward path of multiple hops to other migratory nodes. The forward path is an ordered list of migratory node hops from source to destination. The packet route will be modified at each migratory node because each migratory node removes its own MNID when it transmits the data packet. ACKs are used at each hop to delete migratory node identifier just before the current migratory node's identifier so that the data packet can be retransmitted if necessary. However, the source and destination identifiers are not deleted, so an end-to-end ACK can be sent back to the source. Since the network is mobile, the route of the return ACK must be computed and not traverse the data packet route in reverse order. A four-octet packet ID field 1320 contains a unique packet identifier, so each data packet can be identified with absolute certainty. A sixteen-bit packet lifetime field 1321 contains a packet expiration time (or a timestamp can be used & the network determines the expiration time via elapsed time). A packet CRC field 1215 indicates a cyclical redundancy check. An end flag field 1216 terminates the data packet as previously described. The fields are not necessarily shown in the order in which they are transmitted. The packet route field is transmitted after the packet type field. Additionally, the destination field within a packet route field is transmitted first, so a MAN receiving a packet can determine if the packet is destined for it before committing resources to further process the incoming packet.

Additionally, an optional source, first and destination MAN ID 1318 may be used as described above.

Figure 14:
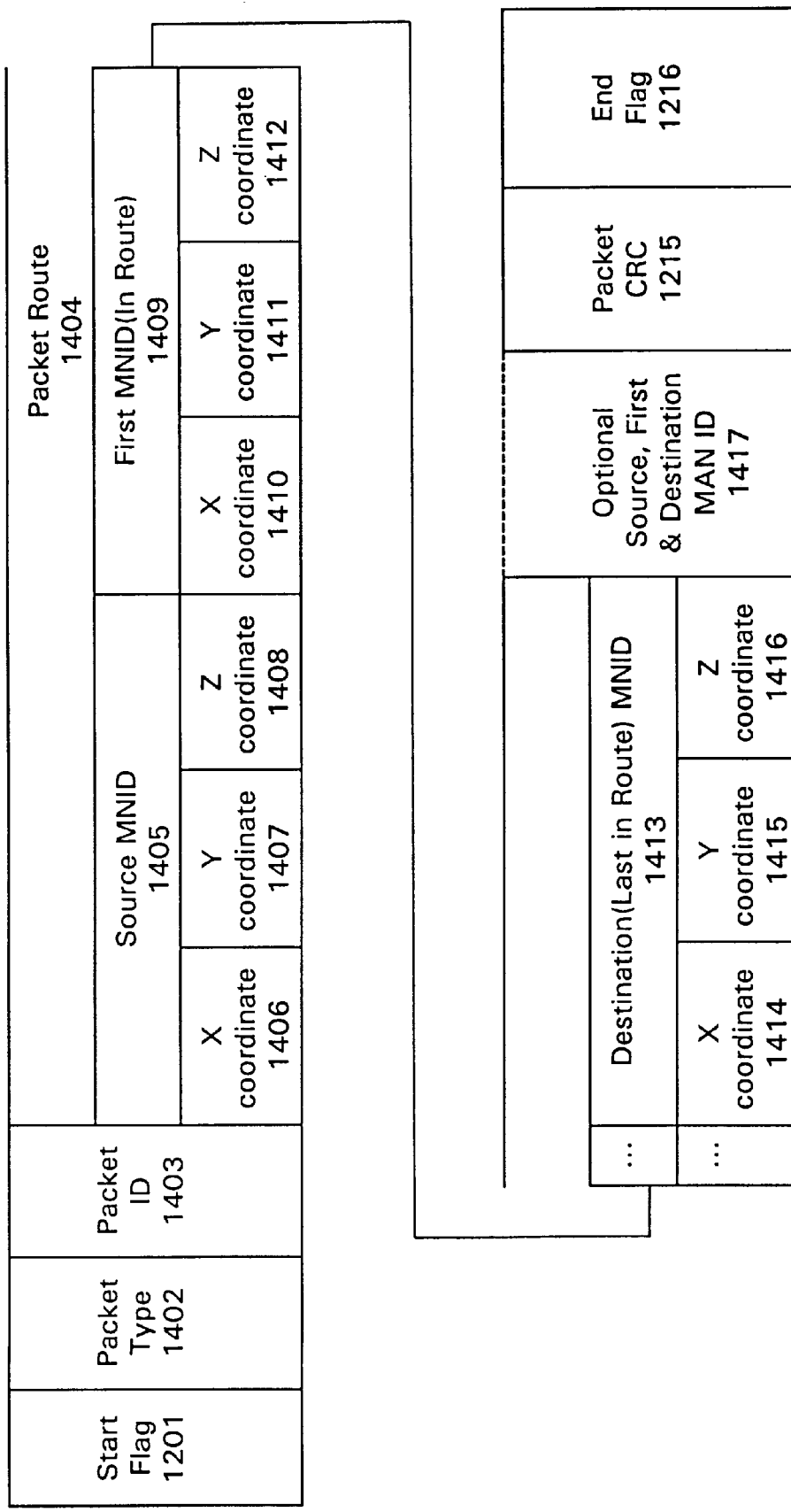
FIG. 14 illustrates a network ACK packet 1400 identifying the major fields of the packet of the second embodiment.

A network ACK packet 1400 illustrated in FIG. 14 identifies major fields of the packet. The network ACK packet acknowledges completion of end-to-end packet transmission over the network. An eight-bit start flag 1201 indicates the beginning of a packet as previously described. A four-bit packet type field 1402 having a bit pattern of 1101 identifies the packet as a network ACK packet. A four-bit packet ID 1403 identifies the packet being acknowledged. A variable size packet route field 1404 indicates the route the network acknowledgment packet will take to reach the destination MAN. The packet route field contains a source MNID field 1405, a first MNID field 1409, various other MNID fields indicating other links to the destination (these MNID fields are not shown to simplify the drawing), and a destination MNID field 1413 indicates the source of the packet being acknowledged. The MNID fields 1405, 1409 and 1413, include x coordinate fields 1406, 1410 and 1414; y coordinate fields 1407, 1411 and 1415;

and z coordinate fields 1408, 1412 and 1416 respectively as previously described. A packet CRC field 1215 indicates a cyclical redundancy check. An end flag field 1216 terminates the network ACK packet as previously described for the other packets. That is, a MAN can drop a packet as soon as it knows it is not intended for it. Therefore, the MAN's resources can be utilized for other purposes instead of being wasted on processing a packet that will be dropped.

Additionally, optional source, first and destination MAN ID 1417 may be used as described above.

Figure 15:
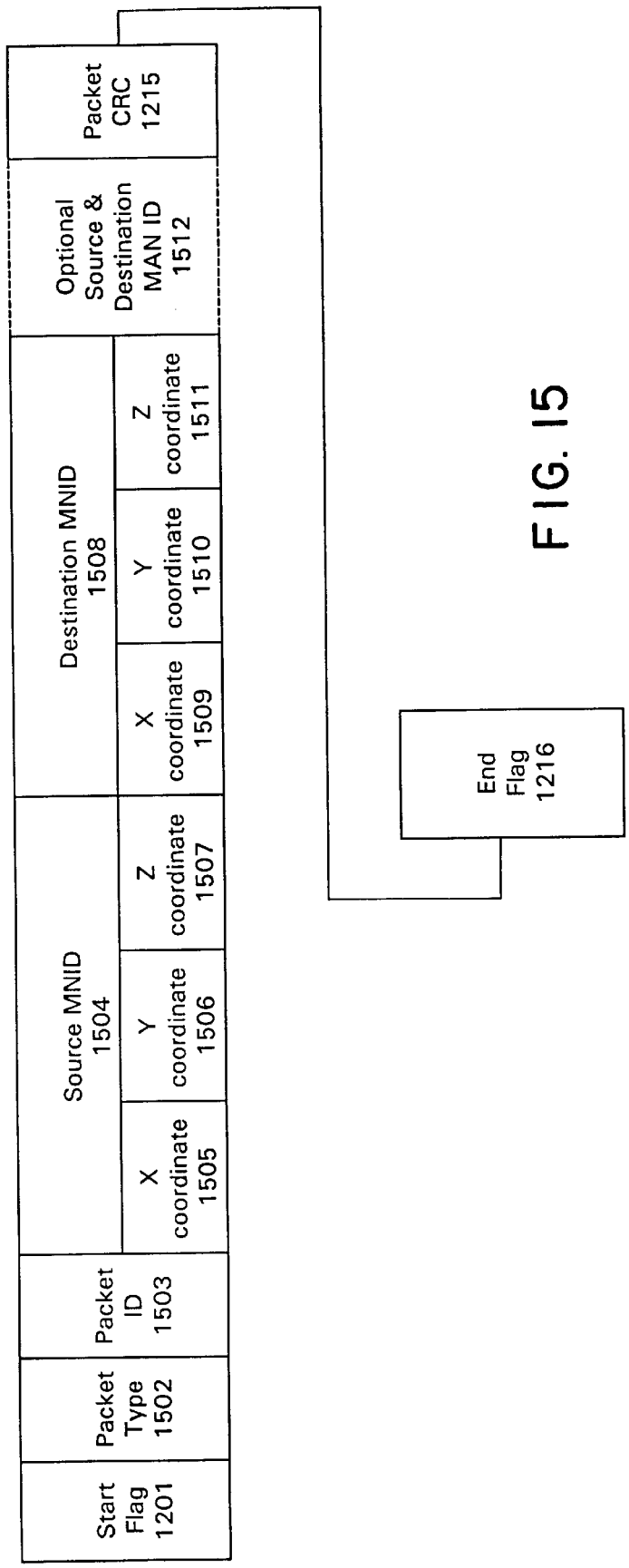
FIG. 15 identifies the pertinent fields within the link ACK packet 1500 of the second embodiment.

FIG. 15 illustrates the pertinent fields within the link ACK packet 1500. A link ACK packet is an acknowledgement indicating that a good inter-node transmission occurred. The acknowledgement is sent to the MAN, which sent the packet. The link ACK packet starts and ends with the 01111110 eight bit start and end flag fields 1201 and 1216 respectively as previously described for other packets. A four-bit packet type field 1502 identifies the packet type to be a link ACK packet. The bit pattern identifying a link ACK packet is 1110. A four-octet packet ID field 1503 identifies the packet being acknowledged. A source and destination MNID field 1504 and 1508 respectively identify the two migratory nodes of the communication link. The source MNID is the ID of the MAN transmitting the link ACK packet and the destination MNID is the MAN, which transmitted the packet being acknowledged.

Additionally, optional source, first and destination MAN ID 1512 may be used as described above.

Figure 16:
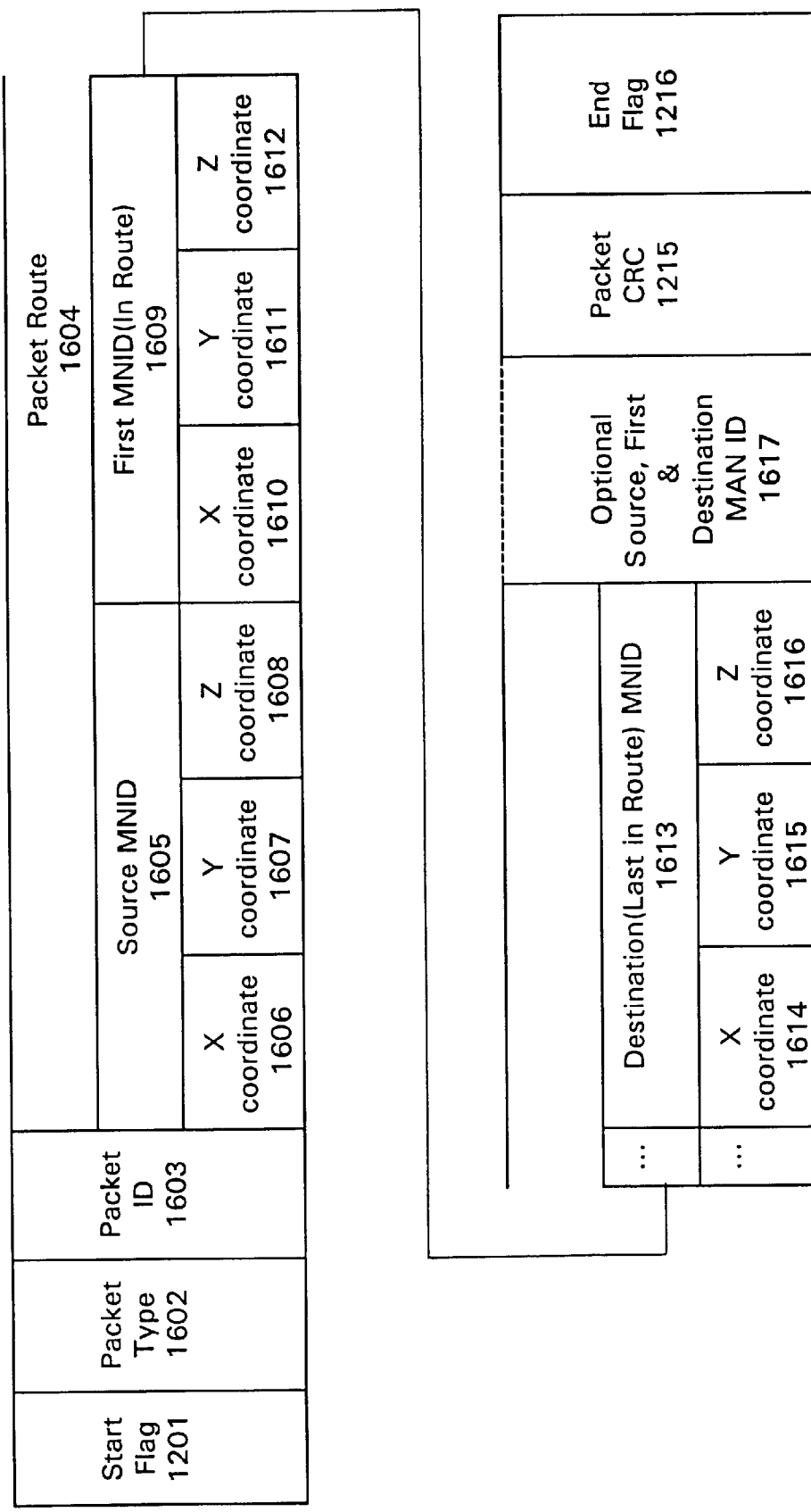
FIG. 16 identifies the major fields of a network negative acknowledgement (NAK) packet 1600 of the second embodiment.

FIG. 16 identifies the major fields of a network negative acknowledgement (NAK) packet 1600. The network NAK packet 1600 includes the start and end flag fields and the packet CRC field 1201 and 1216 and 1215 respectively as previously described. A four-bit packet type field 1603 having a bit pattern of 1100 identifies this packet to be the network NAK packet. A four-octet packet ID field 1603 identifies the source packet being negatively acknowledged. A variable size packet route field 1604 describes the route the network NAK packet will take to reach its destination (the originator of the packet that caused the network NAK). The packet route identifies each MAN hop through a source MNID field 1605, a first MNID field 1609, fields containing all intermediary MNIDs and a destination MNID field 1613. The MNID fields contain x, y and z coordinate fields as previously described (e.g. source MNID 1605 contains x, y and z coordinate fields 1606,1607 and 1608 respectively).

J. Data Flow Control at Receiver End of the Second Embodiment

Figures 1, 17A:
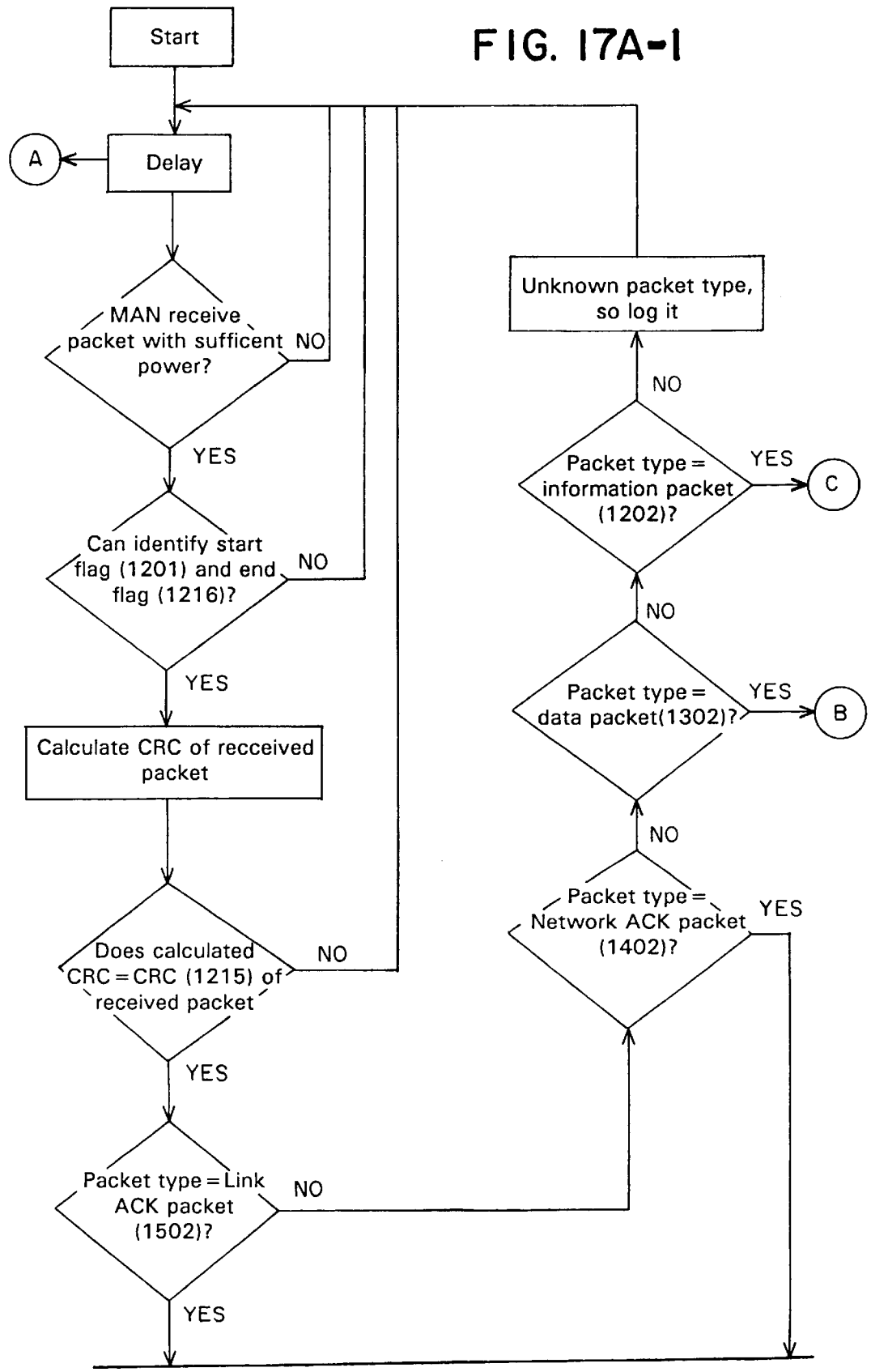
FIGS. 17A–17c are flow diagrams showing how the present invention processes incoming packets which have been latched into temporary storage (e.g., RAM) corresponding to signals received by the signal receiver 213 of the second embodiment.
Figures 2, 17A:
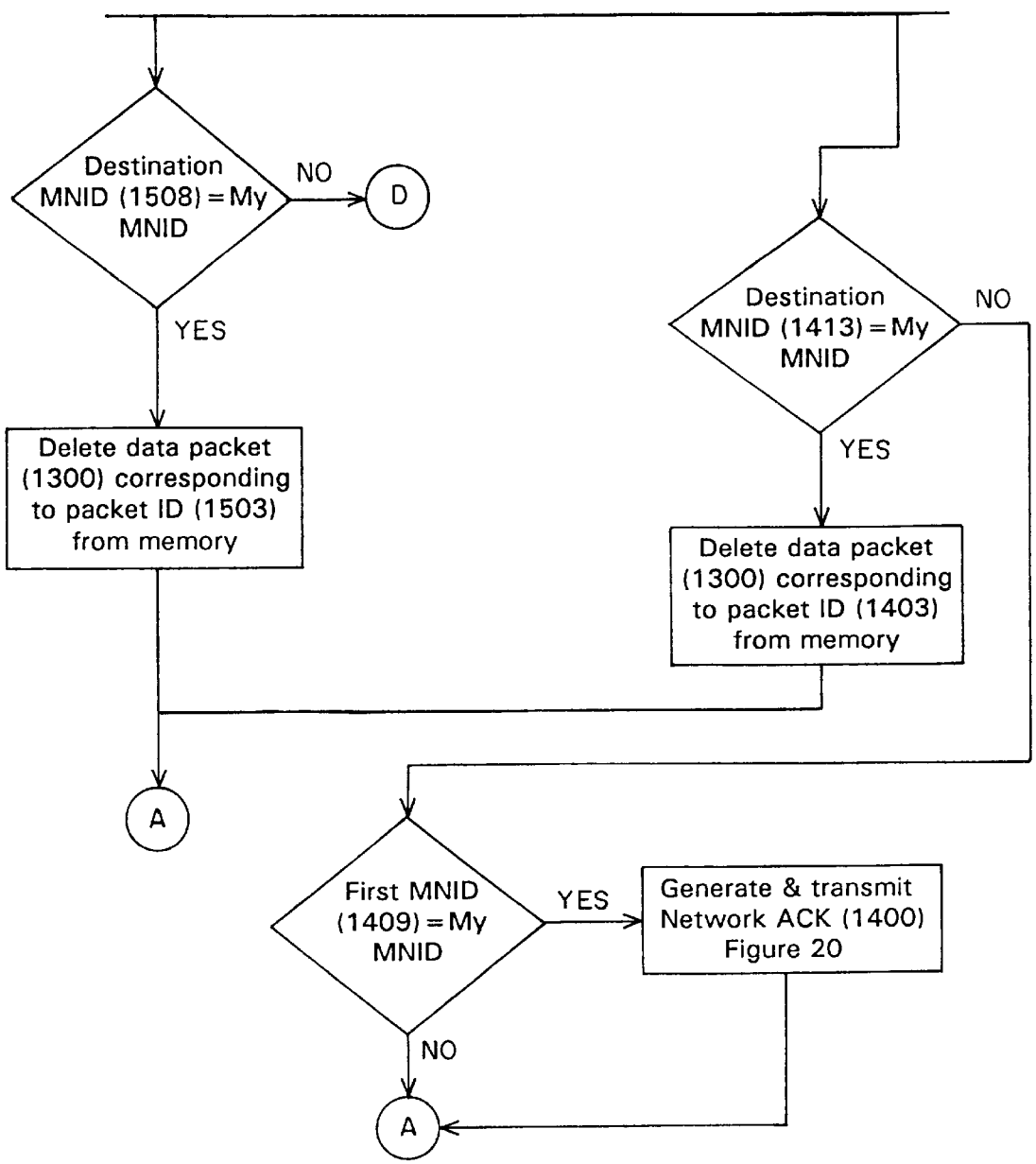
Figures 1, 17B:
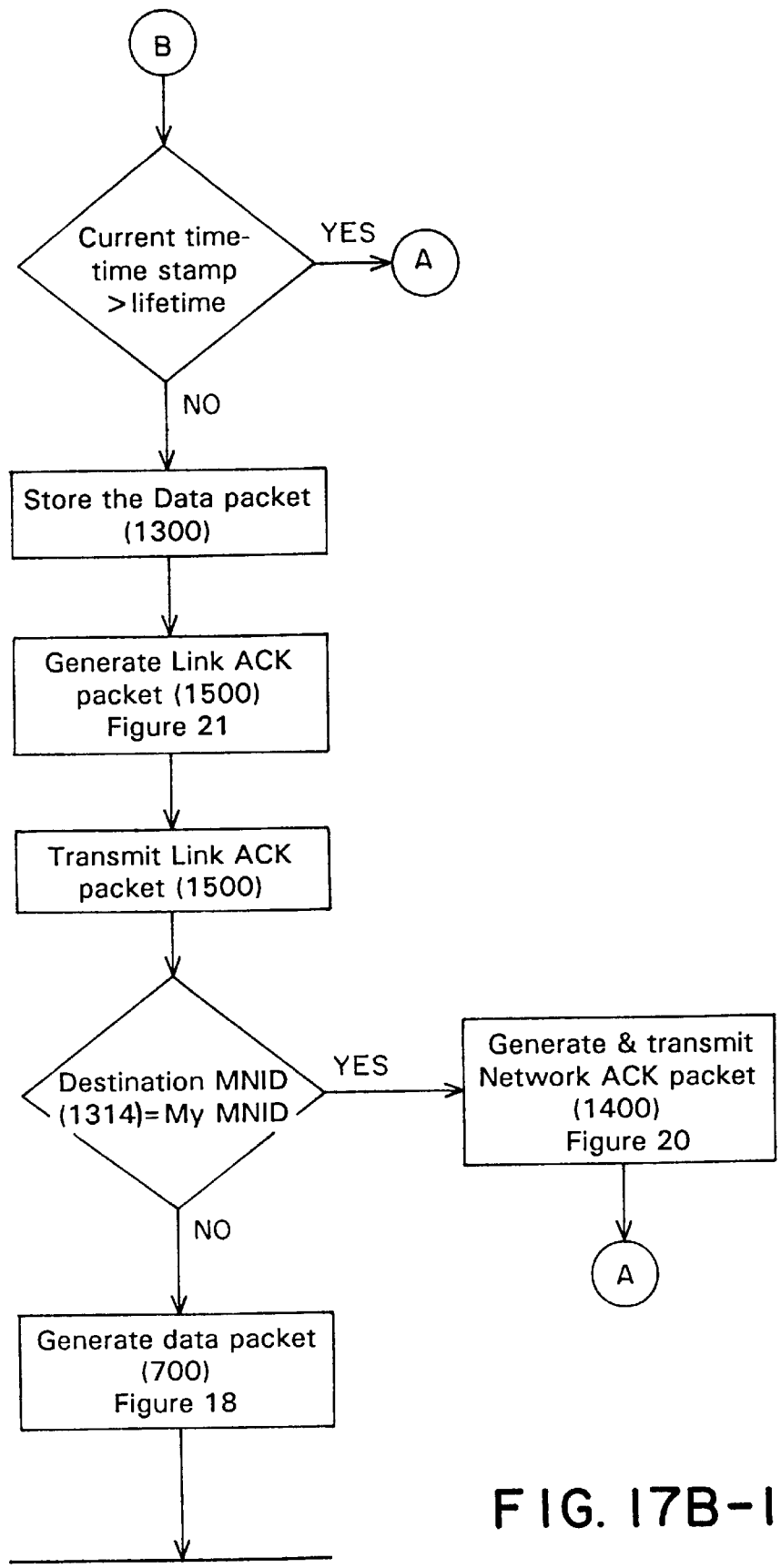
Figures 2, 17B:
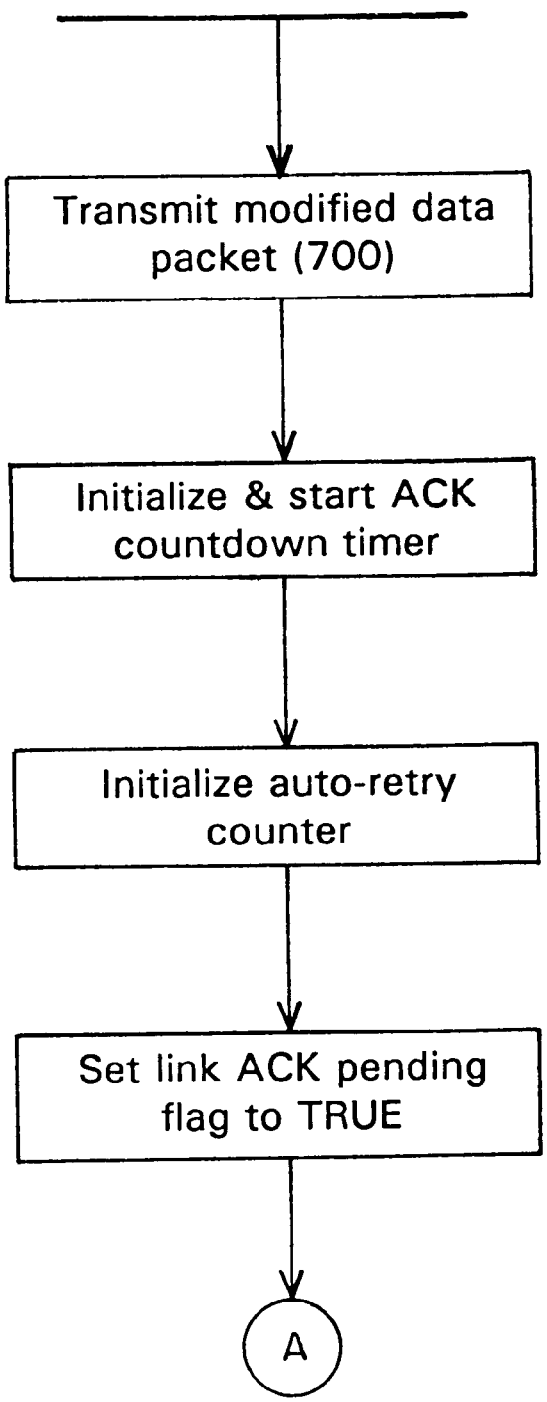
Figure 17C:
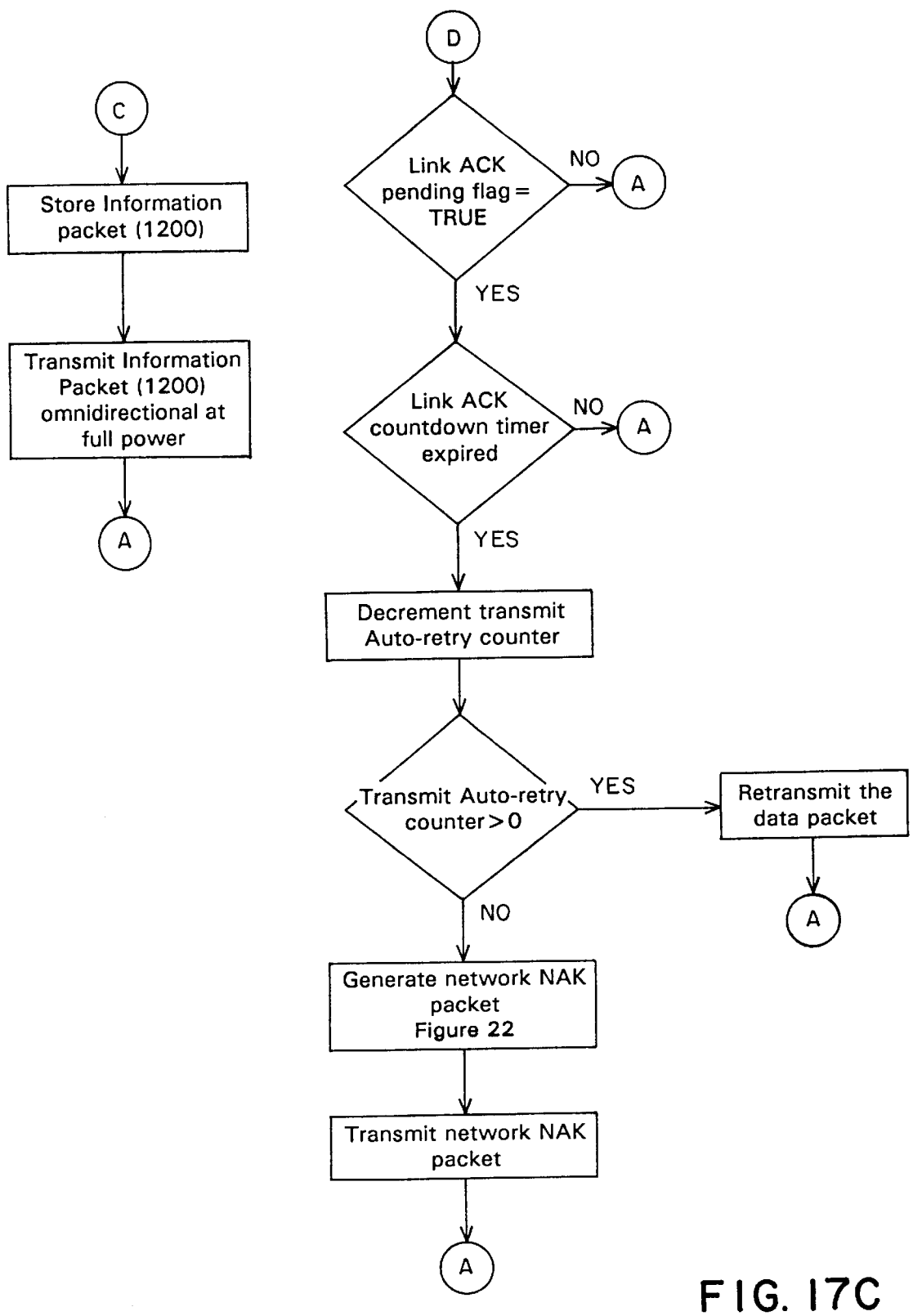

FIGS. 17A–17c is a flow diagram showing how the present invention processes incoming packets which have been latched into temporary storage (e.g., RAM) corresponding to signals received by the signal receiver 213. CPU 250 determines the power or quality of received packets as the receiver latches the incoming packets into its internal register. The CPU moves a received packet from the register to a location in RAM for temporary storage when the power or quality of the packet are sufficient. The CPU tries to identify the start and end flags (1201 and 1216 respectively), i.e., the CPU compares the flags to 01111110. If the start and end flags are identified then the beginning and end of a packet have been located. The CPU calculates a CRC for the received packet and then compares it to the CRC in the packet CRC field 1215 of the received packet. If the two are equal, then it is highly probable that the received packet is a recognizable packet. The CPU identifies the type of packet that has been received by comparing the packet type field bit pattern in the packet type field to the bit patterns indicating a data packet (1111), a link ACK packet (1110), a network ACK packet (1101), or a information packet (0000).

If the packet type is a link ACK packet 1502, then the CPU compares the source MNID field 1504 stored in RAM to the MNID written to RAM during initialization. If they are the same, the CPU deletes the packet stored in RAM corresponding to the packet ID in the packet ID field 1503. This link ACK packet acknowledges good reception of a data packet across a link to the data packet's source MAN.

If the MNIDs are not the same, the CPU checks a link ACK pending flag (i.e., CPU compares the RAM location corresponding to the flag and compares it to one to get a TRUE or FALSE indication) to determine if the MAN is waiting for a link ACK responsive to a data packet that was previously sent. If the link ACK pending flag is FALSE, the CPU continues waiting for incoming packets from the receiver with sufficient power or quality. Otherwise, the CPU performs another check (i.e., the CPU compares the value of the countdown timer in RAM to zero) to determine if a link ACK countdown timer has expired. If the countdown timer has expired, the CPU continues waiting for incoming packets with sufficient signal quality or power from the receiver. On the other hand, the CPU decrements and checks (similar check as previously described) a transmit auto-retry counter to determine whether the resulting value is positive. The data packet waiting for acknowledgement of good reception is retransmitted, if the transmit auto-retry counter is positive. Otherwise, the CPU generates a network negative acknowledgement (NAK) to be transmitted as later explained (see FIG. 22). After the NAK is transmitted, the MAN continues waiting for incoming packets with sufficient signal quality or power.

If the packet type field 1403 indicates a network ACK packet with bit pattern 1000, then the CPU checks to determine if the MNID indicated in the destination MNID field 1413 is the same as the MNID set during initialization. If they are the same, the CPU deletes the data packet 1300 stored in RAM corresponding to the packet ID in the packet ID field 1403. Otherwise, the CPU compares the MNID set during initialization to RAM corresponding to the first MNID in the packet route, which is located in the first MNID field 1409. If the two MNIDs are different, the network ACK packet was intended for a different MAN, so the CPU continues waiting for another incoming packet. On the other hand, if the MNIDs are equal, the network ACK packet is intended for this MAN, so the packet is modified and passed on. The CPU removes the first MNID field 1409 from RAM, thereby making the MNID field following the first MNID field the new first MNID field. This allows the packets to decrease in size as they traverse the network thereby utilizing less network resources. The CPU moves the modified network ACK packet to a register in the transmitter for transmission as later described with reference to FIG. 20. The network ACK packet acknowledges Who good end-to-end network reception of a data packet to the data packet's original network source.

If the packet type field 1302 contains a bit pattern of 1111 indicating a data packet, the CPU checks (similarly to previously described) to determine if the timestamp in the timestamp field 1321 indicates that the packet is stale (e.g. older than 1 hour). If the data packet is stale the data packet is dropped and the CPU continues to wait for new incoming packets. If the data packet is not stale, the CPU writes it into RAM. The CPU generates a link ACK packet 1500 as later described (see FIG. 21) and places it in a register in the transmitter for transmission. The CPU compares the MNID stored in RAM during initialization to the destination MNID in RAM corresponding to the destination MNID field 1314. If they are the same, then the data packet has reached its final destination, so the CPU generates a network ACK packet 1400 (see FIG. 20) as later described and writes the packet to a register in the transmitter. The CPU continues waiting for new incoming packets after transmitting the network ACK packet.

If the received data packet hasn't reached its destination, it must be is modified and retransmitted (see FIG. 16). After the data packet is transmitted, the CPU initializes and starts a link ACK countdown timer. Additionally, an auto-retry counter is initialized. After a link ACK pending flag is set to TRUE, the MAN continues waiting for incoming packets.

It should be noted that the second embodiment uses the lookup table and optional MAN IDs in the same manner as the first embodiment described above.

K. Data Flow Control at Transmitter End of the Second Embodiment

Figures 1, 18:
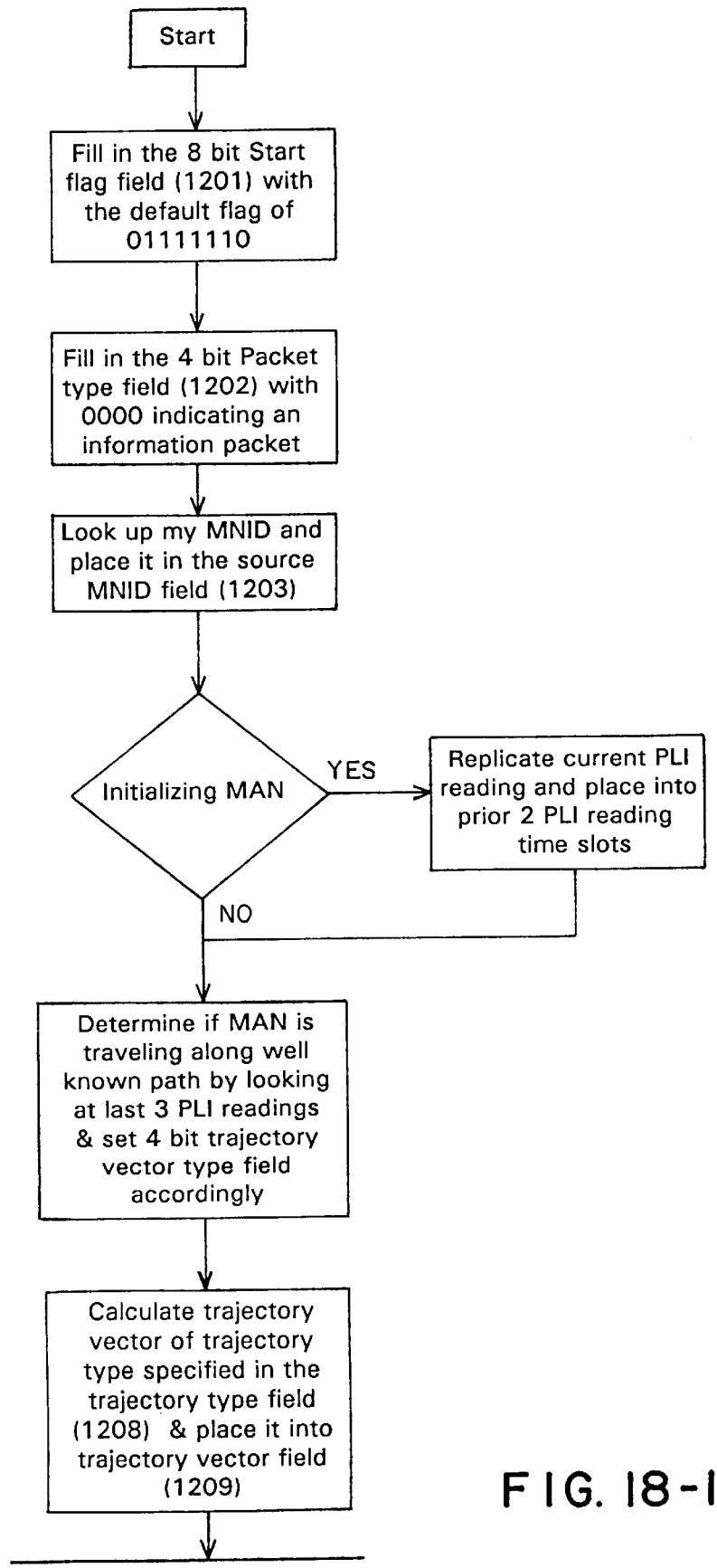
FIG. 18 is a flow diagram illustrating processing of an information packet 1200 at the transmit end of the second embodiment of the present invention.
Figures 2, 18:
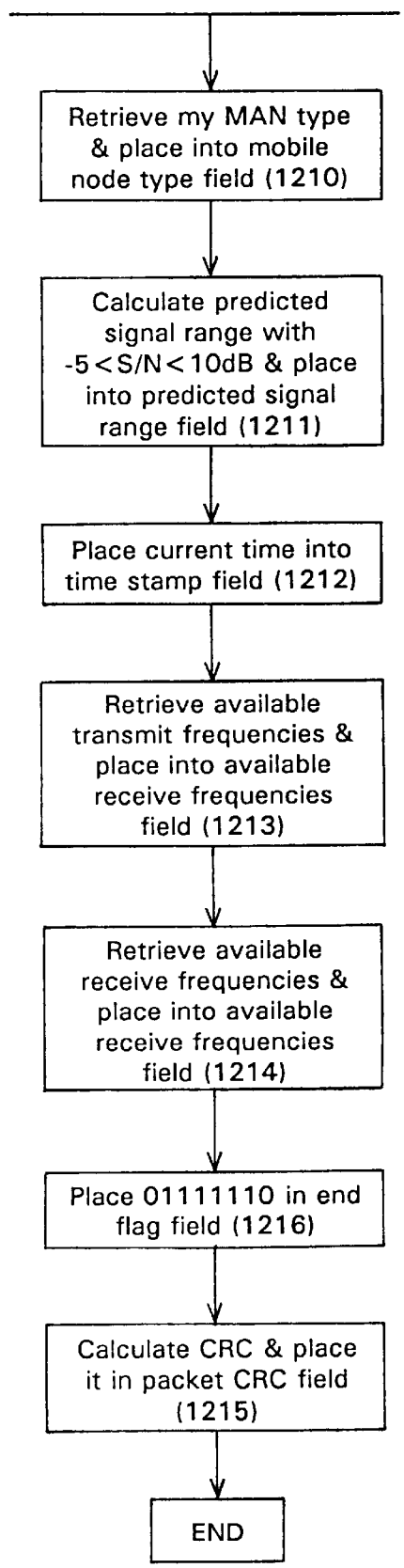

FIG. 18 is a flow diagram illustrating processing of an information packet 1200 at the transmit end of the second embodiment of the present invention. The CPU writes a bit pattern of 01111110 into RAM corresponding to the eight-bit start flag field 1201 indicating the beginning of a new packet. The CPU writes a bit pattern of 0000 into RAM corresponding to the four-bit packet type field 1202 indicating that this packet is of the information type. The CPU reads the MNID stored in RAM during initialization and writes it into RAM corresponding to the 96-bit source MNID field 1203. The MNID field includes a x, y and z field 1204, 1205 and 1206 respectively to identify the MAN (as previously described). Each coordinate field in the MNID field is 32 bits in size. The CPU reads the current location from a register in the physical location identifier (PLI) and writes it into RAM corresponding to two location readings, thereby simulating three recent PLI readings when the MAN is being initialized. If the MAN has already been initialized, the CPU reads RAM corresponding to the most recent three previous PLI readings using them to determine if the MAN is on a well-known route (e.g. a roadway, shipping lane, flight path or railway). If the MAN is moving along a well-known path, the CPU writes a trajectory type indicating the well-known path type into RAM corresponding to the four-bit trajectory vector type field 1208. Otherwise, the CPU writes a trajectory vector type indicating the free form path type into RAM corresponding to the trajectory vector type field. The bit patterns for the roadway, shipping lane, flight path, railway and free form (others may be included also) trajectory vector types are 1111, 1110, 1101, 1100 and 0000 respectively. The CPU calculates a trajectory vector for the MAN and writes it into RAM corresponding to the variable length trajectory vector field 1209 corresponding to the trajectory vector type already specified. The CPU reads RAM corresponding to the MANs type stored at initialization and writes it into RAM corresponding to the migratory node type field 1210. The CPU calculates the predicted signal transmission range for a signal with sufficient quality or power (e.g., $-5<S/N<10$ dB). The CPU writes the predicted signal transmission range into RAM corresponding to the predicted signal range field 1211. The CPU reads the current time from its internal clock and writes it into RAM corresponding to the timestamp field 1212. The CPU reads the available transmit and receive frequencies stored in RAM during initialization and writes them into RAM corresponding to the available transmit and receive frequencies field 1213 and 1214 respectively. The CPU writes the default bit pattern 01111110 into RAM corresponding to the eight-bit end flag field 1216. The CPU calculates the packet CRC using zeros in the CRC field and writes it into RAM corresponding to the one-octet packet CRC field 1215.

Figures 1, 19:
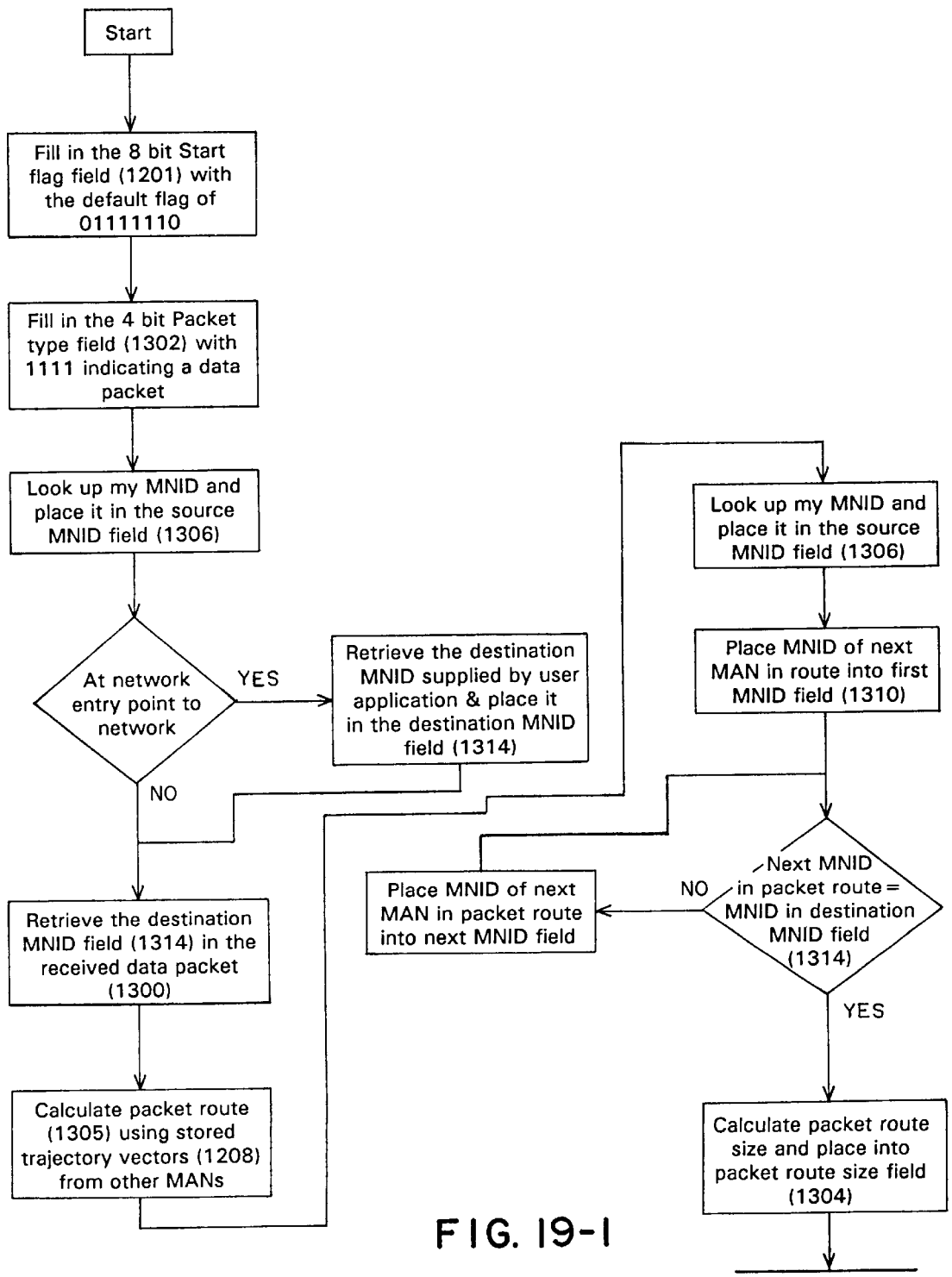
FIG. 19 is a flow diagram illustrating the processing of data packets at the transmission of the present invention
Figures 2, 19:
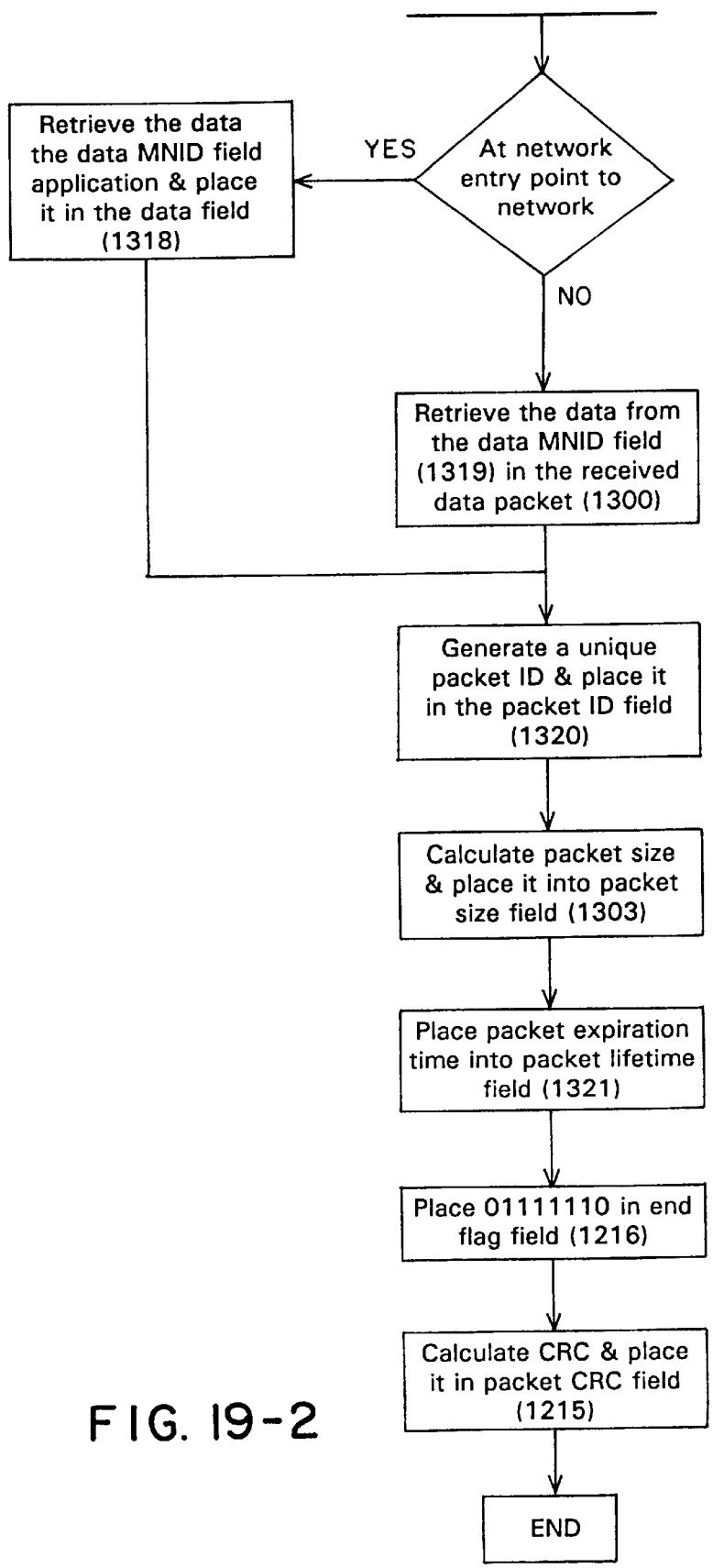

FIG. 19 is a flow diagram illustrating the processing of data packets at the transmission of the present invention. The CPU writes a bit pattern of 01111110 into RAM corresponding to the eight-bit start flag field 1201 indicating the beginning of a new packet. The CPU writes a bit pattern of 1111 into RAM corresponding to the four-bit packet type field 1302 indicating that this packet is a data packet. The CPU reads the MNID stored at initialization and writes it into RAM corresponding to the 96-bit source MNID field 1306. The MNID field includes x, y and z fields 1307, 1308 and 1309 respectively to identify the MAN as previously described. The CPU determines which port the packet was received on (e.g., either RS-232 interface, the Ethernet network interface 270, the signal receiver 213 or other interfaces if there are available) to determine if the packet is coming from within the network or from outside of the network, thereby determining if the MAN is on the edge of the network or not. The 96-bit destination MNID is determined differently if the software module providing the communication interface on the RS-232 port does not support TCP/IP. In this case, the CPU must retrieve the destination MNID from the user application. In the present invention, this is not the case, so the CPU reads the destination MNID from RAM corresponding to the destination MNID field 1314 of the corresponding previously stored data packet 1300. The CPU calculates the remainder of the packet route using stored trajectory vectors 1209 for other MANs. The MNIDs for the remaining packet route are filled in as previously described with respect to the first embodiment. All of the MNIDs are 96 bits as previously described also. Subsequently, the CPU calculates the size of the packet route field 1305 and writes it into RAM corresponding to the packet size route field 1304. It may be necessary to obtain the data from the user application depending on the software providing communication with the RS-232 port as referred to above. The RS-232 port interface of present invention supports TCP/IP, so the CPU reads RAM corresponding to the data field 1319 from RAM corresponding to the previously stored data packet and writes it into RAM corresponding to the data fields 1319. The same approach is used for QOS if it is used. The CPU calculates a unique packet ID and writes it into RAM corresponding to the packet ID field 1319. The CPU calculates the size of the packet and writes it into RAM corresponding to the packet size field 1303. The CPU reads its internal clock and writes the current time into RAM corresponding to the timestamp field 1321. The CPU writes the default bit pattern 01111110 into RAM corresponding to the eight-bit end flag field 1216. The CPU calculates the packet CRC using zeros in the CRC field and writes it into RAM corresponding to the single octet packet CRC field 1215.

Figures 1, 20:
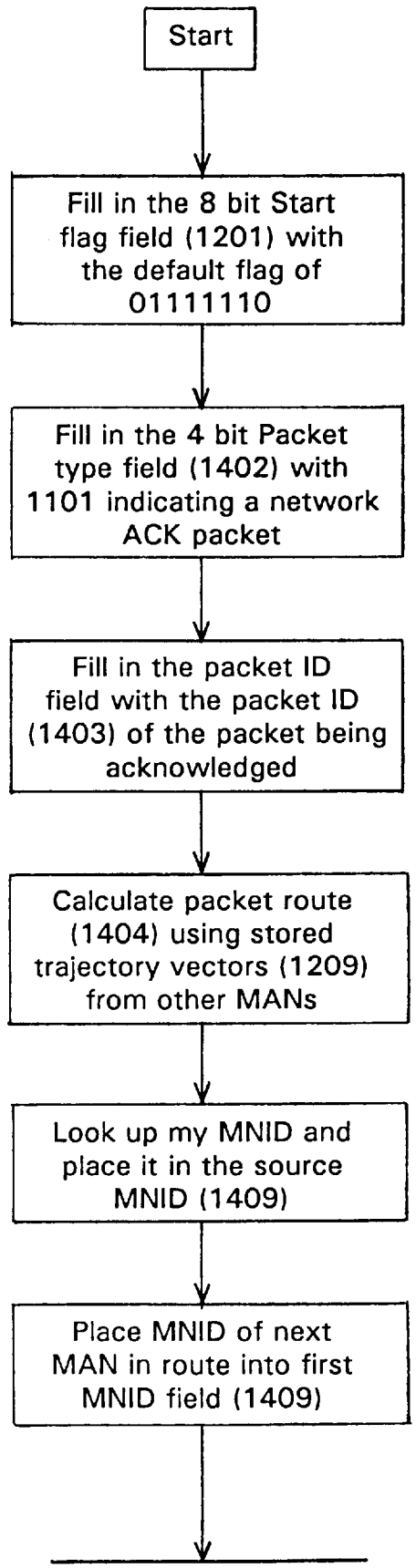
FIG. 20 is a flow diagram illustrating data flow at the transmitter end for network ACK packets of the second embodiment.
Figures 2, 20:
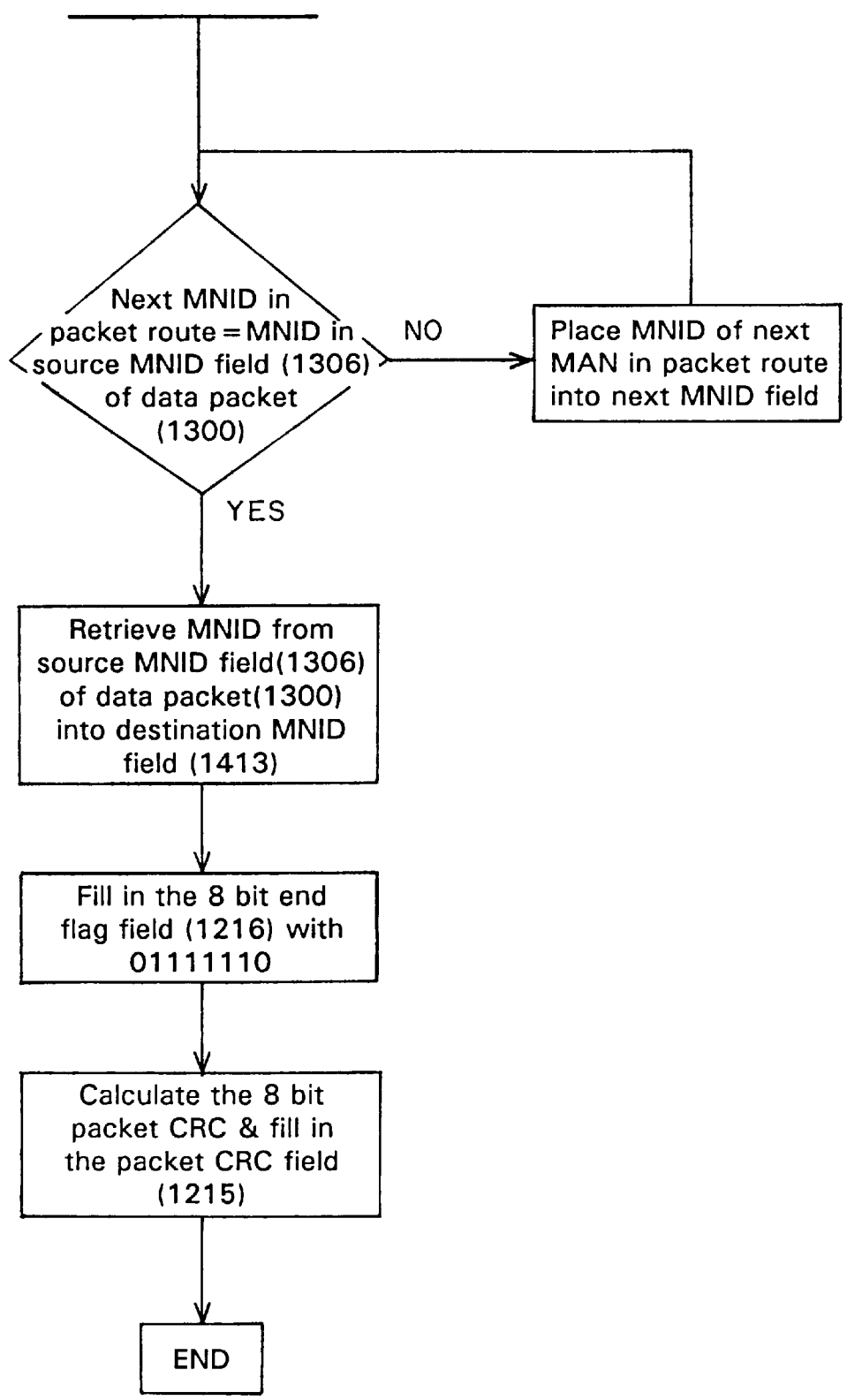

FIG. 20 is a flow diagram illustrating data flow at the transmitter end for network ACK packets. The CPU writes the start and end flag fields 1201 and 1216 into RAM as previously described. The CPU writes a bit pattern of 1101 into RAM corresponding to the packet type field 1402 to identify the packet as a network ACK packet. The CPU reads RAM corresponding to the packet ID from the packet ID field 1320 of the data packet being acknowledged and writes it into RAM corresponding to the packet ID field 1403. The CPU calculates a packet route using stored trajectory vectors from other MANs. The packet route is a list of MNIDs specifying the location the corresponding MAN will be at when the MANs come within range of each other. The packet route field illustrated shows the source MNID first, but it is expected that all applications of the present invention will transmit the source MNID last. This will allow all of the destination fields to be received relatively early in the packet reception process, so the receiving MAN's CPU can decide if it should save the packet or quickly stop processing the packet. The CPU writes the packet route into RAM corresponding to the packet route field as previously described. Finally, the CPU calculates a CRC using zeros for the CRC filed and writes it into RAM corresponding to the CRC field 1215.

Figure 21:
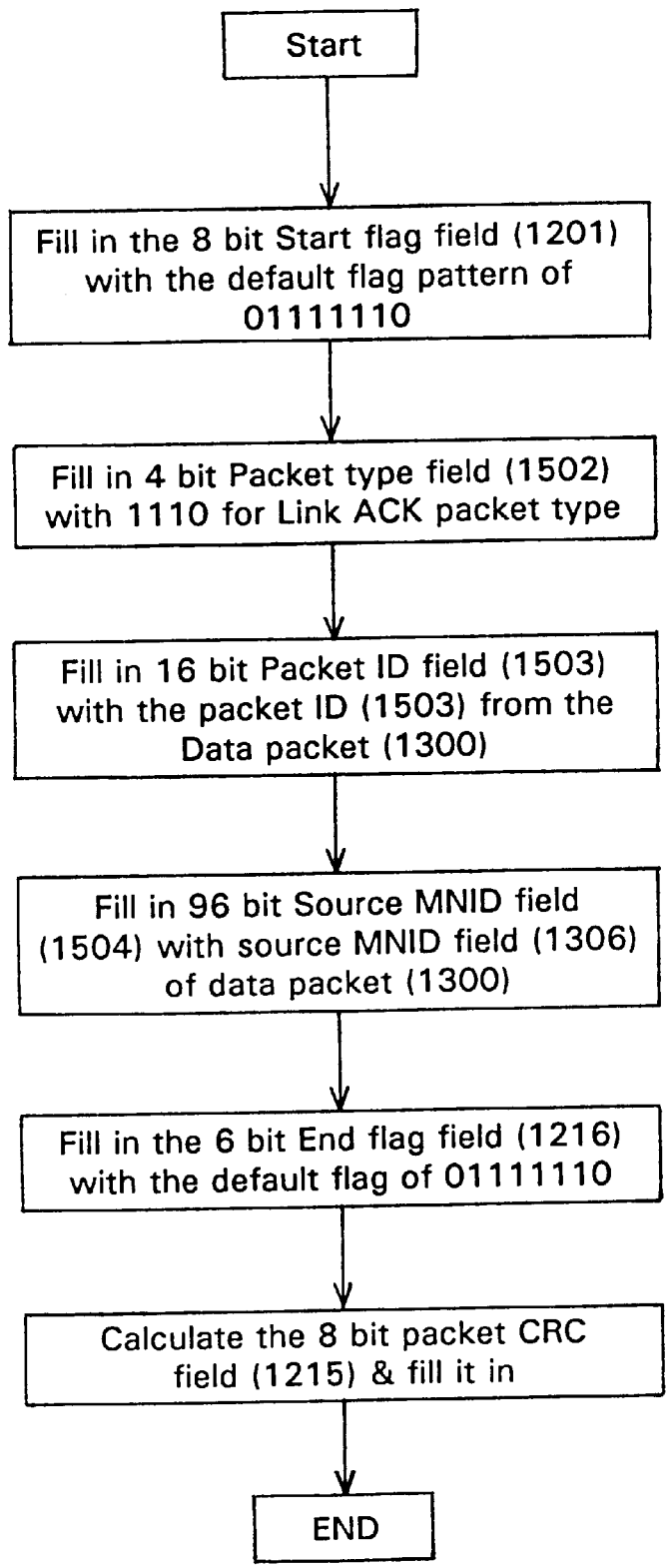
FIG. 21 is a flow diagram demonstrating data flow at the transmitter end of the link ACK packet of the second embodiment.

FIG. 21 is a flow diagram demonstrating data flow at the transmitter end of the link ACK packet. The CPU writes a bit pattern of 01111110 into RAM corresponding to the eight-bit start flag field 1201. The CPU writes a bit pattern of 1110 into RAM corresponding to the packet type field 1502. The CPU reads the packet ID from the data packet being acknowledged in RAM and writes it into RAM corresponding to the packet ID field 1503. The CPU reads the 96-bit 30 source MNID value in the source MNID field 1306 in RAM and writes it into RAM corresponding to the destination MNID field 1508. The CPU reads RAM corresponding to the MNID stored at initialization and writes it into RAM corresponding to the source MNID field 1504. The CPU writes a bit pattern of 01111110 into RAM corresponding to the end flag field 1216. Lastly, the CPU calculates the CRC as previously described and writes it into RAM corresponding to the packet CRC field 1215.

Figures 1, 22:
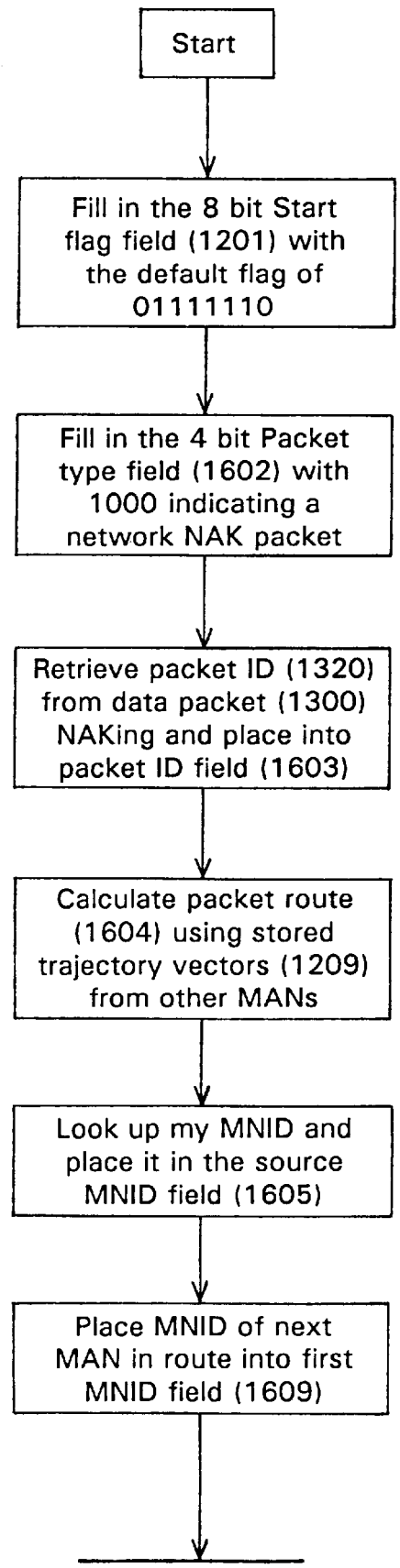
FIG. 22 is a flow diagram illustrating data flow at the transmitter end for network NAK packets of the second embodiment.
Figures 2, 22:
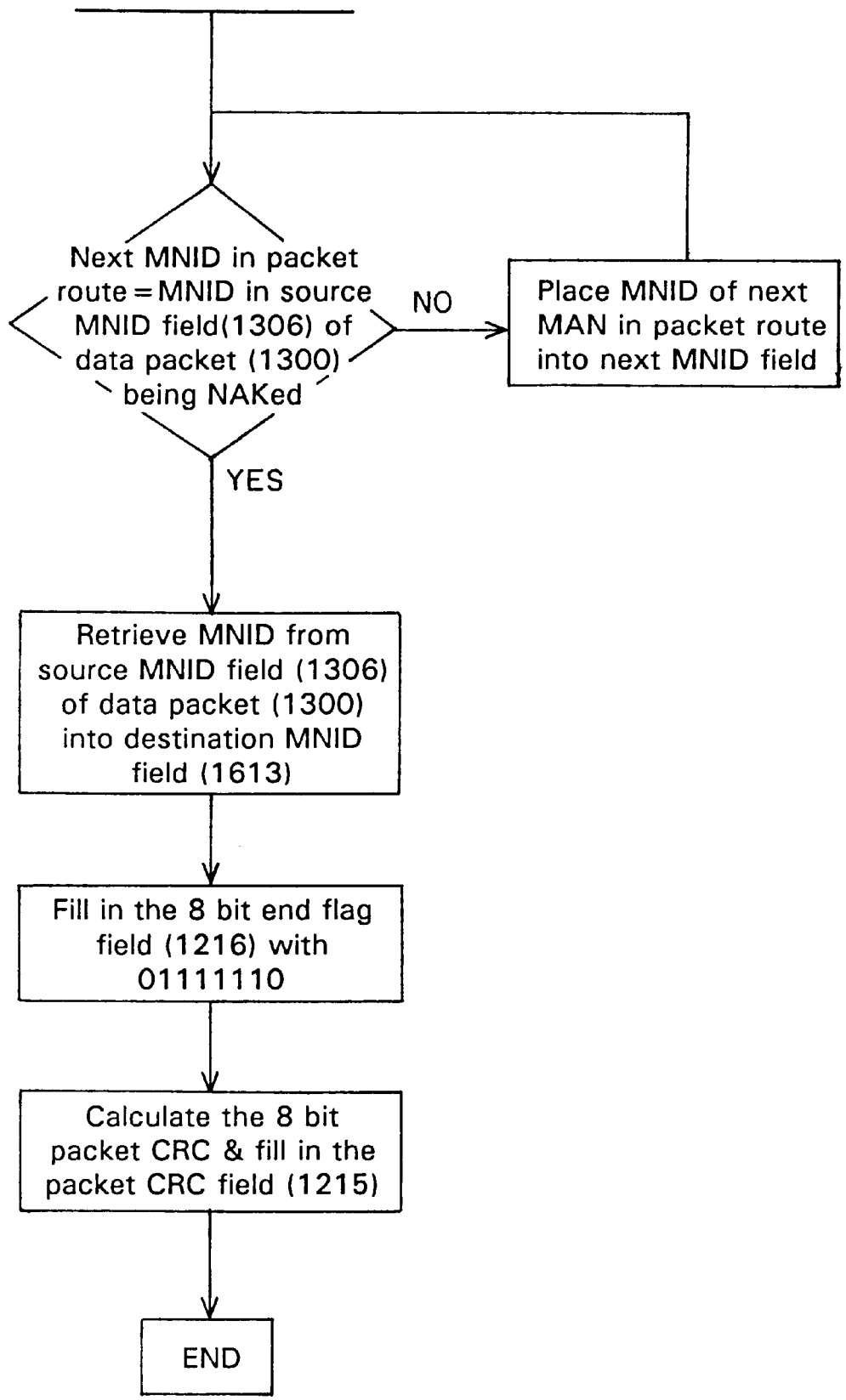

FIG. 22 is a flow diagram illustrating data flow at the transmitter end for network NAK packets. The CPU writes the start and end flag fields 1201 and 1216 as previously described. The CPU writes a bit pattern of a bit pattern of 1101 into RAM corresponding to the packet type field 1602 to identify the packet as a network NAK packet. The CPU reads the packet ID from the packet ID field 1320 of the data packet being negatively acknowledged from RAM and writes it into RAM corresponding to the packet ID field 1603. The CPU calculates a packet route using stored trajectory vectors from other MANs. The packet route is a list of MNIDs specifying the location the corresponding MAN will be at when the MANs come within range of each other. The packet route field illustrated shows the source MNID first, but it is expected that all applications of the present invention will transmit the source MNID last. This will allow all of the destination fields to be received relatively early in the packet reception process, so the receiving MANs CPU can decide if it should save the packet or quickly stop processing the packet. The CPU writes the packet route into RAM corresponding to the packet route field as previously described. Finally, the CPU calculates the CRC as previously described and writes it into RAM corresponding to the CRC field 1215 as previously described.

L. User Interface (User connection to System)

The user interface is a VT100 ASCII terminal accessed through a computer attached to the MAN through the RS-232 port. Any communication software capable of communication over a standard serial connection (e.g. Procomm) may be used for the RS-232 connection. Additionally, the user may attach to the user interface through the 10 Obase-T port. This is supplied to allow remote access to the user interface and provide traditional network access to a network utilizing the present invention. The user interface is a VT100 ASCII terminal, so a user must telnet into the user interface when accessing the user interface through the port.

Conclusion

The above description sets forth illustrative embodiments of the invention and are not intended to limit the scope of the claims. Modifications and variations include methodologies and systems for tracking the nodes, transferring position information required for maintaining up-to-date position information for computing none-to-node routes, packet structure, electromagnetic transmission schemes or protocols, route determination, and the like may take on a variety of forms without departing from the intent and spirit of the invention. For example, instead of providing a regional database to collect position information voluntarily communicated by the nodes, each node may store historical position information handled by it and be summoned by another node or regional database node to provide all or some of the position information it knows of about other nodes with which it has previously communicated or relayed network packets on behalf of other nodes. Similarly, a migratory node may be summoned by a passing migratory or roving node to deliver up the contents of its node position table, however developed, maintained or determined. Shared and/or dedicated communication channels may be employed separately for the conveyance of data, status and/or control messages. Other departures may also occur. Thus, the inventors hereof intend to embrace by the appended claims all such variations and departures as may come to those skilled in the art.

What is claimed is:

1. An autonomously operating migratory node that provides migratory access points of a wireless network, said node comprising:

a user interface capable of receiving a destination ID and a payload message from a user, said destination ID being indicative of a destination node to which said payload message is to be sent, a local ID indicative of said migratory node, a geolocation detector that detects an instantaneous position of said migratory node, a database that receives instantaneous position fixes of other migratory nodes, a wireless transmitter capable of transmitting said payload message to at least another node, a wireless receiver capable of receiving a payload message from at least another node, a processor that effects assembly of a network packet containing said instantaneous position, a source ID indicative of said local ID, a destination ID indicative of said destination node, and said payload message; and said processor further including a routine that obtains position fixes of said ether migratory nodes from said database and that effects determination of a node-to-node path from a source to a destination based on information in said database when said migratory node operates as said source, that effects capture of a payload message when the ID of a received network packet matches said local ID, and that otherwise effects forwarding of said network packet to said destination according to information contained in said network packet.

2. The migratory node as recited in claim 1, wherein said destination ID comprises at least one of an IP address, a telephone number, and a hardware device address; and said payload message comprises a representation of data, voice signals, or video information.

3. The migratory node as recited in claim 2, further including a keyboard, a numeric pad, and/or a telephone handset for generating representations of data.

4. The migratory node as recited in claim 1, wherein said geolocation detector comprises at least one of a GPS receiver, triangulation system, satellite navigation system, and a manual position input for producing said instantaneous position.

5. The migratory node as recited in claim 4, wherein said geolocation detector generates a representation of position according to one of a Cartesian coordinate and polar reference system.

6. The migratory node according to claim 4, wherein said processor determines a path from said source to said destination by computing a route of intermediate nodes lying therebetween based on instantaneous position fixes indicative of the positions of said intermediate nodes.

7. The migratory node as recited in claim 6, wherein plural migratory nodes in the network periodically emit position information indicative of position, said position information being propagated throughout the network for storage in a local memory of each said plural migratory nodes, and said processor consults said local memory for obtaining information to determine the respective positions of intermediate nodes between said source and destination.

8. The migratory node as recited in claim 6, wherein said processor determines said path to said destination according to an expected position based on at least one of speed, direction of travel, and terrain in the vicinity of said destination node.

9. The migratory node as recited in claim 4, wherein said processor effects a return transmission of an acknowledgement packet to a transmitting node during internodal communication.

10. The migratory node as recited in claim 1, wherein said transmitter is multimodal by having plural modes of operation according to at least one of frequency spectrum of operation, spectral bandwidth, data rate, density of migratory nodes in a given region, terrestrial location, and air interface protocols.

11. The migratory node according to claim 10, wherein said processor effects selection of one of said plural modes of operation of said transmitter based on one of location of said node relative to other nodes, proximity of said migratory node to another node, and population density of said nodes in said network.

12. The migratory node as recited in claim 1, wherein said processor employs a lower layer communication protocol including one of segmentation and encapsulation to effect a transparent node-to-node transfer of information packets to nodes implementing higher layer communication protocols.

13. The migratory node as recited in claim 1, wherein said processor effects transmission of unicast, multicast, or broadcast information to one or more nodes in the network.

14. An amorphous communication network that enables wireless conveyance of data in a region without requiring a fixed networking infrastructure, said amorphous communication network including:

at least one roaming access node capable of receiving data from another node and providing remote access to other nodes by forwarding said data according to destination information embodied in said data, said at least one roaming access node further including a local input channel for receiving data from a user and a geolocation system that determines the location of said at least one roaming access node, a database in said at least one roaming access node that stores instantaneous location information of other roaming access nodes in said network, sad at least one roaming access node being operative to convey respective ID information and associated location information to databases of said other roaming access nodes, and said at least one roaming access node further including a processor that effects querying of said database to determine routing to one of said other roaming access nodes prior to a data transmission.

15. An amorphous communication network as recited in claim 14, wherein said at least one roaming access node implements a layered communication protocol to provide access to other nodes at a network layer or lower in order to reduce latency of conveyance of data through the network.

16. An amorphous communication network as recited in claim 15, wherein said geolocation system comprises one of a GPS system, a triangulation system, a satellite navigation system, and a manual input location system.

17. An amorphous communication network as recited in claim 16, wherein said at least one roaming access node determines a path between a source and a destination based on identification and whereabouts of intermediate nodes between said source and destination.

18. An amorphous communication network as recited in claim 17, wherein said processor of a source node assembles a network data packet containing ID and associated instantaneous position fixes of successive intermediate nodes between said source and destination, and upon passage of said network data packet through said network, a processor of another node captures or forwards the packet depending on said ID and associated instantaneous position fixes contained in said data packet.

19. An amorphous communication network as recited in claim 18, wherein said processor receiving said network data packet generates and returns an acknowledgement packet upon successful receipt of said network packet.

20. A method of providing wireless communication in a distributed access network comprising:

providing plural migratory access nodes to populate a region of desire communication service, providing a user input at each of said plural migratory access nodes, providing a geolocation detector at each of said plural migratory access nodes, providing each said nodes with a database of instantaneous position fixes of said plural migratory access nodes in said region, transmitting position fixes of said migratory access nodes in said region, said database of each said node receiving said position fixes and storing said position fixes in the database of said node, accessing said database to determine a node-to-node route between a source migratory access node and destination migratory access node, initiating a transfer of data between said source migratory access node and said destination migratory access node, conveying said data from said source migratory access node to said destination migratory access node by relaying said data between or among said migratory access nodes determined in said accessing step, and receiving said data at said destination roaming access node.

21. The method as recited in claim 20, further including returning an acknowledgement packet to a transmitting node upon a successful node-to-node transfer.

22. The method as recited in claim 20, wherein said migratory nodes include respective transmitters that emit electromagnetic signals representative of network packets, and said method further includes altering transmission characteristics of said transmitter according to one of population density of said nodes, desired rate of conveyance of data, signal strength, bit error rate, environmental surroundings of intermediate access nodes, terrain, terrestrial location, and inter-node distance.

23. A method of providing wireless data communication in an amorphous access network comprising:

providing plural migratory access nodes to populate a region of desire communication service, providing a user input at each of said plural migratory access nodes, providing a database at each of said plural migratory access nodes, providing a geolocation detector at said plural migratory access nodes for generating location information indicative of respective locations of said plural migratory access nodes, transmitting location information of said plural migratory access nodes, said migratory access node receiving said location information and storing said location information in said database, generating a database of said location information, determining, at said migratory access nodes, a node-to-node route of migratory access nodes between a source migratory access node and a destination migratory access node according to said position information of said database, initiating a transfer of data at said source migratory access node, transmitting said data to said destination migratory access node according tc said node-to-node route determined in said determining step, and receiving said data at said destination migratory access node.

* * * * *